United States Patent
Brougher et al.

(10) Patent No.: US 9,760,547 B1
(45) Date of Patent: Sep. 12, 2017

(54) MONETIZATION OF ONLINE CONTENT

(71) Applicant: Google Inc., Mountain View, CA (US)

(72) Inventors: William C. Brougher, Los Altos Hills, CA (US); Nathan Stoll, San Francisco, CA (US); Sepandar D. Karnvar, San Francisco, CA (US); Brian Axe, Portola Valley, CA (US); Christian Oestlien, San Francisco, CA (US)

(73) Assignee: Google Inc., Mountain View, CA (US)

( * ) Notice: Subject to any disclaimer, the term of this patent is extended or adjusted under 35 U.S.C. 154(b) by 800 days.

(21) Appl. No.: 13/843,312

(22) Filed: Mar. 15, 2013

Related U.S. Application Data

(62) Division of application No. 12/333,171, filed on Dec. 11, 2008, now abandoned.
(Continued)

(51) Int. Cl.
*G06F 17/22* (2006.01)
*G06F 17/30* (2006.01)
*G06F 17/24* (2006.01)

(52) U.S. Cl.
CPC ...... *G06F 17/2211* (2013.01); *G06F 17/2294* (2013.01); *G06F 17/30* (2013.01);
(Continued)

(58) Field of Classification Search
None
See application file for complete search history.

(56) References Cited

U.S. PATENT DOCUMENTS 4,807,182 A * 2/1989 Queen ............... G06F 17/2211
  707/999.002
5,758,347 A * 5/1998 Lo ........................... G06F 17/30
(Continued)

FOREIGN PATENT DOCUMENTS

JP 11-161535 6/1999
JP 2001-282940 A 10/2001
(Continued)

OTHER PUBLICATIONS

Korean Notification of Grounds of Rejection on 10-2010-7015402 dated Jun. 9, 2015.
(Continued)

*Primary Examiner* — Mamon Obeid
(74) *Attorney, Agent, or Firm* — Foley & Lardner LLP; John D. Lanza; James De Vellis

(57) ABSTRACT

Methods, computer program products and systems are described for computer implemented online-content management. Multiple online content items authored by multiple authors for online publication are received at one or more first computers. For each online content item, a reputation score is determined for the author corresponding to the online content item. The reputation score is based at least in part on one or more reviews of the online content item provided by one or more reviewers other than the author. An online content item from the multiple online content items is published for display on one or more second computers, which includes displaying an advertisement in conjunction with displaying the online content item. A share of revenue for the author of the online content item for displaying the advertisement is determined based at least in part on the reputation score of the author.

15 Claims, 19 Drawing Sheets

Related U.S. Application Data

(60) Provisional application No. 61/013,248, filed on Dec. 12, 2007.

(52) U.S. Cl.
CPC .... *G06F 17/30002* (2013.01); *G06F 17/3089* (2013.01); *G06F 17/30424* (2013.01); *G06F 17/30867* (2013.01); *G06F 17/24* (2013.01); *G06F 17/3005* (2013.01)

(56) References Cited

U.S. PATENT DOCUMENTS

| | | | |
|---|---|---|---|
| 5,916,024 A | 6/1999 | Von Kohorn | |
| 5,956,726 A * | 9/1999 | Aoyama | G06F 17/2211 707/755 |
| 6,122,624 A | 9/2000 | Tetro et al. | |
| 6,240,414 B1 | 5/2001 | Beizer et al. | |
| 6,263,447 B1 | 7/2001 | French | |
| 6,285,999 B1 * | 9/2001 | Page | G06F 17/30728 |
| 6,314,420 B1 * | 11/2001 | Lang | G06F 17/3061 |
| 6,829,005 B2 | 12/2004 | Ferguson | |
| 6,895,385 B1 | 5/2005 | Zacharia et al. | |
| 7,013,001 B1 | 3/2006 | Felger et al. | |
| 7,039,951 B1 | 5/2006 | Chaudhari et al. | |
| 7,080,073 B1 * | 7/2006 | Jiang | G06F 17/2229 |
| 7,086,085 B1 | 8/2006 | Brown et al. | |
| 7,092,821 B2 * | 8/2006 | Mizrahi | A63F 13/10 702/1 |
| 7,124,129 B2 | 10/2006 | Bowman et al. | |
| 7,155,157 B2 | 12/2006 | Kaplan | |
| 7,185,065 B1 * | 2/2007 | Holtzman | G06F 17/2745 705/36 R |
| 7,231,657 B2 | 6/2007 | Honarvar et al. | |
| 7,234,156 B2 | 6/2007 | French et al. | |
| 7,243,109 B2 * | 7/2007 | Omega | G06F 17/3071 707/737 |
| 7,333,635 B2 | 2/2008 | Tsantes et al. | |
| 7,343,552 B2 * | 3/2008 | Denoue | G06F 17/241 715/230 |
| 7,363,492 B2 | 4/2008 | Kuhlman et al. | |
| 7,406,436 B1 | 7/2008 | Reisman | |
| 7,437,364 B1 * | 10/2008 | Fredricksen | G06F 17/30011 |
| 7,483,871 B2 | 1/2009 | Herz | |
| 7,509,345 B2 * | 3/2009 | DeSpain | G06F 17/24 |
| 7,512,628 B2 | 3/2009 | Chess et al. | |
| 7,519,562 B1 * | 4/2009 | Vander Mey | G06Q 30/02 705/12 |
| 7,536,346 B2 * | 5/2009 | Aliffi | G06Q 20/403 705/3 |
| 7,564,993 B2 | 7/2009 | Kondo et al. | |
| 7,565,534 B2 * | 7/2009 | Starbuck | H04L 63/08 713/168 |
| 7,599,926 B2 | 10/2009 | Takahashi et al. | |
| 7,599,938 B1 * | 10/2009 | Harrison, Jr. | G06F 17/30867 705/12 |
| 7,660,781 B2 * | 2/2010 | Chau | G06F 17/30873 707/637 |
| 7,685,117 B2 * | 3/2010 | Gross | G06F 17/30867 707/999.005 |
| 7,716,199 B2 * | 5/2010 | Guha | G06F 17/30637 707/706 |
| 7,725,477 B2 * | 5/2010 | Wiseman | G06F 17/30867 707/758 |
| 7,734,502 B1 | 6/2010 | Yehoshua et al. | |
| 7,747,630 B2 | 6/2010 | Scofield et al. | |
| 7,778,926 B1 * | 8/2010 | Grinchenko | G06F 21/6218 705/50 |
| 7,783,652 B2 | 8/2010 | Anderson et al. | |
| 7,783,668 B2 | 8/2010 | Vogel et al. | |
| 7,797,274 B2 * | 9/2010 | Strathearn | G06F 17/30017 707/609 |
| 7,822,631 B1 | 10/2010 | Vander Mey et al. | |
| 7,822,703 B1 | 10/2010 | Rodriguez-Val et al. | |
| 7,836,050 B2 | 11/2010 | Jing et al. | |
| 7,853,515 B2 * | 12/2010 | Harrison, Jr. | G06Q 30/0601 705/35 |
| 7,853,984 B2 | 12/2010 | Antell et al. | |
| 7,881,701 B2 | 2/2011 | Chen et al. | |
| 7,908,280 B2 * | 3/2011 | Frank | G06F 17/30241 707/749 |
| 7,908,645 B2 | 3/2011 | Varghese et al. | |
| 7,912,767 B1 * | 3/2011 | Cheatham | G06Q 10/10 705/31 |
| 7,913,162 B2 * | 3/2011 | Hansen | G06F 17/241 715/230 |
| 7,925,649 B2 | 4/2011 | Jeh et al. | |
| 7,941,835 B2 | 5/2011 | Wolfond et al. | |
| 7,991,725 B2 | 8/2011 | Ghosh et al. | |
| 8,015,484 B2 | 9/2011 | Backer | |
| 8,020,005 B2 | 9/2011 | Mani et al. | |
| 8,028,229 B2 * | 9/2011 | Bailor | G06F 17/2288 715/255 |
| 8,103,618 B2 | 1/2012 | Carter et al. | |
| 8,112,548 B2 * | 2/2012 | Cui | G06F 17/30905 455/412.1 |
| 8,126,882 B2 * | 2/2012 | Lawyer | G06Q 10/063 705/7.11 |
| 8,150,842 B2 | 4/2012 | Brougher et al. | |
| 8,171,458 B2 | 5/2012 | Cheng et al. | |
| 8,201,109 B2 * | 6/2012 | Van Os | G06F 3/0488 715/710 |
| 8,296,671 B2 * | 10/2012 | Narayanan | G06F 9/543 715/764 |
| 8,326,833 B2 * | 12/2012 | Muguda | G06F 17/30616 704/9 |
| 8,370,423 B2 * | 2/2013 | Ozzie | G06F 17/30578 709/203 |
| 8,374,973 B2 | 2/2013 | Herbrich et al. | |
| 8,438,468 B2 * | 5/2013 | Berg | G06F 8/73 715/230 |
| 8,635,552 B1 * | 1/2014 | Park | G06F 3/0485 345/684 |
| 8,639,625 B1 * | 1/2014 | Ginter | G06F 21/10 705/50 |
| 8,645,396 B2 | 2/2014 | McNally et al. | |
| 8,676,835 B2 * | 3/2014 | Bartholomew | G06F 17/30743 707/769 |
| 8,745,488 B1 * | 6/2014 | Wong | G06F 17/24 715/221 |
| 8,755,799 B1 * | 6/2014 | Tiraspolsky | H04W 60/00 455/410 |
| 8,924,465 B1 * | 12/2014 | Tunguz-Zawislak | H04N 21/00 709/203 |
| 9,158,741 B1 * | 10/2015 | Hansen | G06F 3/0488 |
| 9,299,350 B1 * | 3/2016 | Dumont | G06F 21/32 |
| 2001/0032210 A1 * | 10/2001 | Frank | G06Q 10/06 |
| 2002/0198866 A1 | 12/2002 | Kraft et al. | |
| 2003/0009365 A1 * | 1/2003 | Tynan | G06F 17/3089 705/50 |
| 2003/0125964 A1 * | 7/2003 | Chang | G06F 21/10 705/51 |
| 2003/0189592 A1 | 10/2003 | Boresjo | |
| 2003/0195847 A1 | 10/2003 | Felger | |
| 2004/0029567 A1 | 2/2004 | Timmins et al. | |
| 2004/0068527 A1 * | 4/2004 | Smith, III | G06F 17/30855 |
| 2004/0162751 A1 * | 8/2004 | Tsyganskiy | G06Q 30/0203 705/7.32 |
| 2004/0210525 A1 | 10/2004 | Campbell | |
| 2004/0225577 A1 | 11/2004 | Robinson | |
| 2005/0022106 A1 | 1/2005 | Kawai et al. | |
| 2005/0071328 A1 * | 3/2005 | Lawrence | G06F 17/30867 |
| 2005/0097319 A1 | 5/2005 | Zhu et al. | |
| 2005/0114526 A1 * | 5/2005 | Aoyama | A63F 13/12 709/228 |
| 2005/0125307 A1 | 6/2005 | Hunt et al. | |
| 2005/0149383 A1 | 7/2005 | Zacharia et al. | |
| 2005/0154886 A1 | 7/2005 | Birk et al. | |
| 2005/0183005 A1 * | 8/2005 | Denoue | G06F 17/241 715/202 |
| 2005/0234877 A1 | 10/2005 | Yu | |

(56) References Cited

U.S. PATENT DOCUMENTS

| | | |
|---|---|---|
| 2005/0235062 A1 | 10/2005 | Lunt et al. |
| 2006/0004628 A1 | 1/2006 | Axe et al. |
| 2006/0021009 A1 | 1/2006 | Lunt |
| 2006/0041589 A1* | 2/2006 | Helfman ............ G06F 17/3089 |
| 2006/0042483 A1 | 3/2006 | Work et al. |
| 2006/0048047 A1* | 3/2006 | Tao ..................... G06F 17/241 |
| | | 715/232 |
| 2006/0069670 A1* | 3/2006 | Khaliq ............. G06F 17/30873 |
| 2006/0116926 A1* | 6/2006 | Chen ..................... G06Q 30/02 |
| | | 705/14.23 |
| 2006/0123081 A1* | 6/2006 | Baudino ............... G06Q 30/02 |
| | | 709/204 |
| 2006/0129538 A1* | 6/2006 | Baader ............ G06F 17/30864 |
| 2006/0184997 A1 | 8/2006 | La Rotonda et al. |
| 2006/0190475 A1* | 8/2006 | Shi ....................... G06Q 30/02 |
| 2006/0200755 A1 | 9/2006 | Melmon et al. |
| 2006/0212925 A1 | 9/2006 | Shull et al. |
| 2006/0212930 A1 | 9/2006 | Shull et al. |
| 2006/0242554 A1* | 10/2006 | Gerace ............ G06F 17/30867 |
| | | 715/209 |
| 2007/0016629 A1* | 1/2007 | Reinsch ............. G06F 17/3028 |
| 2007/0038931 A1* | 2/2007 | Allaire ............... G06Q 30/0239 |
| | | 715/206 |
| 2007/0055926 A1* | 3/2007 | Christiansen ......... G06F 17/241 |
| | | 715/210 |
| 2007/0101400 A1 | 5/2007 | Freeman et al. |
| 2007/0124226 A1* | 5/2007 | Garner, Jr. .............. G06Q 40/00 |
| | | 705/35 |
| 2007/0192169 A1 | 8/2007 | Herbrich et al. |
| 2007/0220417 A1* | 9/2007 | Mathew .............. G06F 17/3089 |
| | | 715/234 |
| 2007/0220479 A1 | 9/2007 | Hughes |
| 2007/0239684 A1 | 10/2007 | Anderson et al. |
| 2007/0256143 A1* | 11/2007 | Prafullchandra ........ H04L 9/321 |
| | | 726/28 |
| 2007/0283321 A1 | 12/2007 | Hegde et al. |
| 2007/0294281 A1* | 12/2007 | Ward ..................... G06Q 30/02 |
| 2008/0005064 A1* | 1/2008 | Sarukkai ............. G06F 17/241 |
| 2008/0005086 A1* | 1/2008 | Moore ............. G06F 17/30876 |
| 2008/0059260 A1* | 3/2008 | Jeffrey ................... G06Q 10/00 |
| | | 705/7.11 |
| 2008/0059348 A1* | 3/2008 | Glassman ............... G06Q 30/02 |
| | | 705/35 |
| 2008/0072294 A1 | 3/2008 | Chatterjee |
| 2008/0082381 A1* | 4/2008 | Muller ................. G06Q 20/145 |
| | | 705/344 |
| 2008/0086759 A1 | 4/2008 | Colson |
| 2008/0089678 A1 | 4/2008 | Suzuki |
| 2008/0091681 A1 | 4/2008 | Dwivedi et al. |
| 2008/0091684 A1 | 4/2008 | Ellis et al. |
| 2008/0101572 A1 | 5/2008 | Chen et al. |
| 2008/0109244 A1* | 5/2008 | Gupta ..................... G06Q 30/02 |
| | | 705/1.1 |
| 2008/0109245 A1 | 5/2008 | Gupta |
| 2008/0109491 A1 | 5/2008 | Gupta |
| 2008/0120166 A1 | 5/2008 | Fernandez et al. |
| 2008/0127305 A1 | 5/2008 | Ross |
| 2008/0147487 A1* | 6/2008 | Hirshberg ............ G06Q 30/02 |
| | | 705/14.53 |
| 2008/0155686 A1* | 6/2008 | McNair ................. G06Q 10/10 |
| | | 726/21 |
| 2008/0189163 A1 | 8/2008 | Rosenberg et al. |
| 2008/0227078 A1* | 9/2008 | Miller ..................... G09B 7/00 |
| | | 434/322 |
| 2008/0262907 A1* | 10/2008 | Broady ................. G06Q 30/02 |
| | | 705/14.46 |
| 2008/0262908 A1* | 10/2008 | Broady ................. G06Q 30/02 |
| | | 705/14.66 |
| 2008/0288324 A1* | 11/2008 | Graczynski ....... G06F 17/30536 |
| | | 705/7.14 |
| 2008/0295151 A1 | 11/2008 | Xia |
| 2009/0013041 A1 | 1/2009 | Farmer et al. |
| 2009/0030773 A1 | 1/2009 | Kamhoot |
| 2009/0037983 A1 | 2/2009 | Chiruvolu et al. |
| 2009/0038005 A1 | 2/2009 | Howarth |
| 2009/0063247 A1* | 3/2009 | Burgess ................. G06Q 30/02 |
| | | 705/7.34 |
| 2009/0089264 A1 | 4/2009 | Lavine |
| 2009/0089678 A1* | 4/2009 | Sacco ................. G06F 17/3089 |
| | | 715/733 |
| 2009/0109244 A1 | 4/2009 | Conner et al. |
| 2009/0119258 A1* | 5/2009 | Petty ....................... G06Q 30/02 |
| 2009/0125382 A1* | 5/2009 | Delepet ............. G06F 17/30864 |
| | | 705/347 |
| 2009/0125518 A1* | 5/2009 | Bailor ...................... G06F 17/24 |
| 2009/0132689 A1* | 5/2009 | Zaltzman ............... G06Q 10/00 |
| | | 709/223 |
| 2009/0144272 A1 | 6/2009 | Adarsh et al. |
| 2009/0150394 A1* | 6/2009 | Bailor ................. G06F 17/2288 |
| 2009/0157490 A1 | 6/2009 | Lawyer |
| 2009/0157491 A1* | 6/2009 | Brougher ............. G06Q 10/063 |
| | | 705/59 |
| 2009/0157667 A1 | 6/2009 | Brougher et al. |
| 2009/0165128 A1 | 6/2009 | McNally et al. |
| 2009/0171723 A1 | 7/2009 | Jenkins |
| 2009/0171990 A1* | 7/2009 | Naef, III ................ G06Q 10/06 |
| 2009/0186689 A1 | 7/2009 | Hughes et al. |
| 2009/0193053 A1 | 7/2009 | Swart |
| 2009/0204470 A1 | 8/2009 | Weyl et al. |
| 2009/0210444 A1 | 8/2009 | Bailey et al. |
| 2009/0216589 A1 | 8/2009 | Ricci |
| 2009/0216608 A1* | 8/2009 | Bechtel ................... G06Q 10/10 |
| | | 705/7.32 |
| 2009/0216859 A1 | 8/2009 | Dolling |
| 2009/0222721 A1 | 9/2009 | Parkinson |
| 2009/0276233 A1 | 11/2009 | Brimhall et al. |
| 2009/0282241 A1* | 11/2009 | Prafullchandra ..... H04L 63/102 |
| | | 713/156 |
| 2009/0282438 A1 | 11/2009 | White |
| 2009/0313681 A1 | 12/2009 | Kim et al. |
| 2010/0064365 A1 | 3/2010 | Kanduri et al. |
| 2010/0076851 A1* | 3/2010 | Jewell, Jr. .......... G06Q 30/0271 |
| | | 705/14.67 |
| 2010/0114910 A1 | 5/2010 | Lee et al. |
| 2010/0153404 A1 | 6/2010 | Ghosh et al. |
| 2010/0198836 A1 | 8/2010 | Glass et al. |
| 2010/0293057 A1* | 11/2010 | Haveliwala ........ G06Q 30/0269 |
| | | 705/14.66 |
| 2010/0318893 A1* | 12/2010 | Matthews ............. G06F 17/241 |
| | | 715/230 |
| 2010/0318922 A1 | 12/2010 | Strathearn et al. |
| 2010/0332392 A1 | 12/2010 | Ueno et al. |
| 2011/0019088 A1* | 1/2011 | Kase ................... H04N 5/44513 |
| | | 348/468 |
| 2011/0035789 A1 | 2/2011 | Callahan et al. |
| 2011/0137789 A1 | 6/2011 | Kortina et al. |
| 2011/0271329 A1 | 11/2011 | Hulten et al. |
| 2012/0011587 A1 | 1/2012 | Byrne et al. |
| 2012/0030553 A1* | 2/2012 | Delpha ............. G06F 17/30029 |
| | | 715/205 |
| 2012/0059700 A1* | 3/2012 | Darbyshire ............ G06F 21/10 |
| | | 705/14.16 |
| 2012/0089617 A1 | 4/2012 | Frey |
| 2012/0095837 A1 | 4/2012 | Bharat et al. |
| 2012/0109745 A1* | 5/2012 | Bhamidipati ...... G06Q 30/0251 |
| | | 705/14.49 |
| 2012/0124057 A1 | 5/2012 | Daoud et al. |
| 2012/0130723 A1 | 5/2012 | Bhattacharjee |
| 2012/0215773 A1 | 8/2012 | Si et al. |
| 2012/0265755 A1 | 10/2012 | McNally et al. |
| 2013/0007012 A1 | 1/2013 | Selkowe Fertik et al. |
| 2013/0007014 A1 | 1/2013 | Fertik et al. |
| 2013/0198086 A1* | 8/2013 | Mardikar ............ G06Q 20/1085 |
| | | 705/71 |
| 2014/0281872 A1* | 9/2014 | Glover ................ G06F 17/2211 |
| | | 715/229 |

(56) References Cited

U.S. PATENT DOCUMENTS

2015/0149404 A1* 5/2015 Lock .................... H04L 65/403
707/608
2015/0312441 A1* 10/2015 Kashima ............ H04N 1/32352
358/1.11

FOREIGN PATENT DOCUMENTS

| JP | 2001-290781 | 10/2001 |
|---|---|---|
| JP | 2002-189880 | 7/2002 |
| JP | 2004-139343 | 5/2004 |
| JP | 2006-048463 | 2/2006 |
| KR | 10-2002-0026702 A | 4/2002 |
| KR | 1020040053680 | 6/2004 |
| KR | 10-2005-0038867 | 4/2005 |
| KR | 10-2006-0020874 A | 3/2006 |
| WO | WO 03/102776 | 12/2003 |
| WO | WO-03/102776 | 12/2003 |
| WO | WO 2009/073664 | 6/2009 |
| WO | WO 2009/076555 | 6/2009 |

OTHER PUBLICATIONS

US Office Action on Dtd Oct. 30, 2014.
U.S. Appl. No. 12/333,171 dated Feb. 12, 2015.
U.S. Appl. No. 12/333,171 Dtd Apr. 23, 2014.
"Internet Book List as Crawled" by WayBack Machine on Feb. 8, 2007.
International Preliminary Report on Patentablity from International Application No. PCT/US2008/085270 dated Jun. 17, 2010, 6 pages.
International Search Report and Written Opinion from International Application No. PCT/US2008/085270 dated Jun. 28, 2009, 11 pages
"Moderation System" Wikipedia, the Fee Encyclopedia [online] Dec. 3, 2004 <URL: http //en.wikipedia.org/wiki/Moderation_system> [retrieved Mar. 24, 2009], 2 pages.
"PageRank" Wikipedia, the Free Encyclopedia. [online] Jan. 1, 2007 <URL: http://en.wikipedia.org/wiki/Pagerank> [retrieved Mar. 22, 2009], 7 pages.
Review-Script Homepage, Review-Script.com [online] Oct. 16. 2006 <URL: http://www.review-script.com> [retrieved : Mar. 22, 2009], 2 pages.
"Slashdot" Wikipedia, the Free Encyclopedia. [online] Jun. 2, 2007 <URL: http://en.wikipedia.org/wiki/Slashdot> [retrieved Mar. 24, 2009], 10 pages.
"Yahoo! Answers" Wikipedia, the Free Encyclopedia, [online] Jul. 16, 2006 <URLLhttp://en.wikipedia.org/wiki/yahoo_answers> [retrieved Mar. 24, 2009], 2 pages
"Your Real Name Attribution" Amazon.com Help Topics, Amazon.com, Inc. [online] Jan. 19. 2007 <http.//www.amazon.com/gp/help/customer/display.html?ie=UTF8&nodeID=14279641> [retrieved Jan. 20, 2011], 11 pages.
International Preliminary Report on Patentatbility from International Application No. PCT/US2008/086480 mailed Jun. 24, 2010, 7 pages.
International Search Report from International Application No. PCT/US2008/086480 mailed Jul. 27, 2009. 3 pages.
Arrington: Michael, "Companies I'd Like to PRofile (But Don't Exist)" [online] Nov. 21, 2005 <URL: http://www.techcrunch.com/2005/11/21/companies-id-like-to-profile-but-dont-exist/> [retrieved Mar. 9, 2009], 24 pages.
"Badges" Amazon.com Help Topics. Amazon.com, Inc [online] Jan. 6, 2007 <URL: http://www amazon.com/gp/help/customer/display.html/ref=help_search_1-1?ie=UTF8nodeID=14279681 &qid=1276716542&sr=1-1, [retrieved Mar. 22, 2009] 4 pages.
"Bitkeeper" Wikipedia [online] Oct. 3. 2007 <URL: http://en.wikipedia.org/wiki/Bitkeeper> [retrieved Mar. 22, 2009], 3 pages.
"Case Study Major Card Issuear Prevents Identify Fraud and Streamlines Operations With ID scored Risk" Equifax, Inc. May 2007, 2 pages.

Consumer Information Sheet for eIDverifier, Equifax, Inc. [online] 2006 <URL: http://www.equifax.com/cs7/BlobServern?blobcol=urldata&blobheadername1=content-type &blobheadername2=Content-Disposition &blobheadername3=MDT-Type &blobheadervalue1=application%2Fpdf &blobheadervalue2=inline%3B+filename%3DEFS-594-ADV-eIDVerifier.pdf&blobheadervalue3=abinary%3B+charset+UTF-8 &blobkey=id&blobtable=MungoBlobs &blobwhere=1188333172550&ssbinary=true> [retrieved Jun. 28, 2008].
"Git" Wikipedia [online] Oct. 5. 2007 <URL: http://en.wikipedia.org/wiki/Git_%28software%29> [retrieved Mar. 22, 2009], 11 pages.
"Identify Manager Verification Technical Details" TransUnion LLC [online], Sep. 30, 2007 <URL: http://www.transunion.com/docs/techservices/IdMgr_Technical_Details.pdf> [retrieved Sep. 28, 2007], 4 pages.
"Your Real Name Attribution" Amazon.com Help Topics, Amazon.com, Inc. [online Jan. 19. 2007 <URL not available> [retrieved Mar. 21, 2009} 8 pages.
"Transclusion" Wikipedia [online] Jul. 15, 2007 <URL: http //web.archive.org/web/20070808083012/http:/en.wikipedia.org/wiki/Transclusion> [retrieved Mar. 22, 2009], 5 pages.
"TrustPlus Preview: Community of Trust to Make the Internet the Safest Place on Ear" TrustPlus, Inc. [online] Sep. 10, 2007. <URL: http://www.TrustPlus.com> [retrieved Mar. 8, 2009], 2 pages.
Whitin, Dave et al., "Predictive Modeling for True Name Fraud" An Equifax Predictive Sciences Research Paper. Equifax, Inc. Sep. 2006, 9 pages.
"Wikipedia: About" Wikipedia [online] Nov. 11, 2007 <URL:Http://en.wikipedia.org/wiki/Wikipedia.About> [retrieved Mar. 22, 2009], 12 pages.
U.S. Appl. No. 12/333,142, filed Dec. 11, 2008.
U.S. Appl. No. 12/333,130, filed Dec. 11, 2008.
U.S. Appl. No. 13/529,268, filed Jun. 21, 2012
U.S. Appl. No. 14/141,307, filed Dec. 26, 2013.
U.S. Appl. No. 12/333,153, filed Dec. 11, 2008.
U.S. Appl. No. 12/333,171, filed Dec. 11, 2008.
U.S. Appl. No. 61/013,248, filed Dec. 12, 2007.
U.S. Appl. No. 11/955,188, filed Dec. 12, 2007.
U.S. Appl. No. 12/861,372, filed Aug. 23, 2010.
Final Office Action dated Aug. 8, 2010 for U.S. Appl. No. 12/333,171.
Final Office Action dated Dec. 8, 2011 for U.S. Appl. No. 12/333,171.
Final Rejection dated Jan. 26, 2011 for U.S. Appl. No. 12/333,142.
International Preliminary Report on Patentability for PCT Appl. Ser. No. PCT/US2008/086480 dated Jun. 15, 2010 (6 pages).
International Search Report for PCT Appl. Ser. No. PCT/US2008/086480 dated Jul. 27, 2009 (7 pages).
Non-Final Office Action dated Apr. 1, 2011 for U.S. Appl. No. 12/333,171.
Non-Final Office Action dated Feb. 18, 2010 for U.S. Appl. No. 12/333,171.
Non-Final Office Action dated Jan. 17, 2013 for U.S. Appl. No. 13/529,268.
Non-Final Office Action dated Jun. 10, 2011 for U.S. Appl. No. 12/333,153.
Non-Final Office Action dated Jun. 25, 2010 for U.S. Appl. No. 12/333,142.
Non-Final Office Action dated May 26, 2011 for U.S. Appl. No. 12/333,130.
Non-Final Office Action dated Nov. 10, 2010 for U.S. Appl. No. 12/861,372.
Notice of Allowance dated Apr. 16, 2012 for U.S. Appl. No. 12/333,130.
Notice of Allowance dated Jan. 22, 2010 for U.S. Appl. No. 11/955,188.
Notice of Allowance dated Jan. 23, 2012 for U.S. Appl. No. 12/333,153.
Notice of Allowance dated Nov. 4, 2011 for U.S. Appl. No. 12/333,142.

(56) References Cited

OTHER PUBLICATIONS

Notice of Allowance dated Sep. 23, 2011 for U.S. Appl. No. 12/861,372.
Notice of Allowance dated Sep. 27, 2013 for U.S. Appl. No. 13/529,268.
Office Action for EPO Appl. Ser. No. 08859273.8 dated Aug. 16, 2012.
Office Action for Japanese Appl. Ser. No. 2010-538167 dated Apr. 2, 2013.
Supplemental European Search Report for EPO Appl. Ser. No. 08859273.8 dated Jul. 4, 2012.
U.S. Appl. No. 12/333,11, filed Dec. 11, 2008.

* cited by examiner

Knol

Advanced Search

Advanced Search Tips | About Knol

| | | | |
|---|---|---|---|
| Find results | with all of the words | | [ 10 results ▼ ] [ Google Search ] |
| | with the exact phrase | | |
| ☐ Knols | with at least one of the words | | |
| ☐ Edits | without the words | | |
| ☐ Discussions | | | |
| ☐ Web | | | |
| Language | Return pages written in | any language ▼ | |
| File Format | [ Only ▼ ] return results of the file format | any format ▼ | |
| Date | Return web pages updated in the | anytime ▼ | |
| Numeric Range | Return web pages containing numbers between [ ] and [ ] | | |
| Occurrences | Return results where my terms occur | anywhere in the page ▼ | |
| Domain | [ Only ▼ ] return results from the site or domain | | e.g. google.com, .org More info |
| Usage Rights | Return results that are | not filtered by license ▼ | |
| | | More info | |
| SafeSearch | ⊙ No filtering   ○ Filter using SafeSearch | | |

Page-Specific Search

| | | | |
|---|---|---|---|
| Similar | Find pages similar to the page | [ ] | [ Search ] |
| Links | Find pages that link to the page | [ ] | [ Search ] |
| | | e.g. www.google.com/help.html | |

MONETIZATION OF ONLINE CONTENT

CROSS-REFERENCE TO RELATED APPLICATION

This application is a Divisional of U.S. patent application Ser. No. 12/333,171, entitled "Monetization of Online Content," filed Dec. 11, 2008, now pending, which claims priority to U.S. Provisional Application Ser. No. 61/013,248, entitled "User-Created Content Aggregation and Sharing", filed on Dec. 12, 2007, the entire contents of both of which are hereby incorporated herein by reference.

TECHNICAL FIELD

The instant specification relates to enabling users, such as authors, to share content in a public system in a manner that can be authenticated, and to enabling various users of the system to comment on the content, locate quality content in which they may have an interest, and to determine which authors generate the best content.

BACKGROUND

The internet is a great democracy—for a large part, a free-for-all of content. Anyone can post almost anything they like, through blogs, other web pages, posted videos (e.g., on YouTube), with comments on pages of other users, and in numerous other ways. As a result, there is no end of information on the internet. But there is often a real dearth of high quality information, or the high quality information may be difficult to find among all the low quality content.

Although well known commercial writers, such as columnists for major newspapers, often generate some of the best written content, other rather unknown writers often can do just as well but are never recognized for their work. Using the internet, such writers can reach a gigantic audience, but they need to get noticed. Also, they need to make sure that other, malicious people, do not pretend to be them, and thus destroy their reputation.

Anonymity on the internet is easy, and makes for fabulous freedom of contribution (e.g., users have no fear of retribution for making honest comments). But it also makes it easy for any person of questionable background to pass themselves off as knowledgeable and then to amplify their viewpoint disproportionately, while making it difficult for those who are actually knowledgeable to provide proof of identity and credentials to correct fallacious information.

Authentication of users may take a variety of forms. For example, Facebook will generally trust that a user is a student at a university if the user has a currently valid e-mail address from the university. eBay tracks users via log in to keep records of how satisfied other are with the users' transactions, and Amazon.com uses so-called "Badges" for users. Merchants may require a credit card number and mailing address (or zip code) for the credit card bill along with a number printed on the back of the card. Other systems may use a challenge response protocol, such as by sending password information to an e-mail address that has previously been associated with a user. Other systems also permit a universal sign in, such as the various services available from GOOGLE. Moreover, systems like GOOGLE's WebmasterTools and SiteMaps permit webmasters to establish that they truly are associated with a site, by making them change the content of the site, and then checking to see that the content was changed in the prescribed manner.

SUMMARY

This document discloses systems and techniques for managing a community of content creators, or authors, and users who read content created by those authors. The users can themselves be authors, either of original works or of reviews or comments concerning original content provided by others, or comments on comments made by other users. The systems here may provide authorship tools to assist in such content creation and submission, tools for signing content, and tools for managing user reputations (e.g., as determined by reviews that other users provide for content). In addition, various mechanisms may be provided to reward authors for submitting high-quality content, including financial awards and social awards.

In general, in one aspect, methods, computer program products and systems are described relating to online-content management. Multiple online content items authored by multiple authors for online publication are received. For each online content item, a reputation score is determined for the corresponding author. The reputation score can be based on one or more reviews of the online content item provided by one or more reviewers other than the author. In response to a query for online content, wherein the online content item is included in a set of search results, a ranking of the online content item in the set is determined based at least in part on the reputation score of the author.

In general, in another aspect, methods, computer program products and systems are described wherein multiple online content items are received that are authored by multiple authors for online publication. For each online content item, a reputation score is determined for the corresponding author. The reputation score can be based on one or more reviews of the online content item provided by one or more reviewers other than the author. An online content item from the multiple online content items is published, which includes displaying an advertisement in conjunction with displaying the online content item. A share of revenue for the author of the online content item for displaying the advertisement is determined based at least in part on the reputation score of the author.

Implementations of the methods, computer program products and systems can include one or more of the following features. The reputation score can be further based on a level of fame of the author. The reputation score of the author can be elevated if the author's online content item has been published by a publisher determined as publishing only online content given a review exceeding a predetermined threshold. The reputation score of the author can be further based on how many other online content items of the author have been published.

Where the author has published other online content items, the reputation score of the author can be further based on how recently the other online content items published. The reputation score can be further based on a previous reputation score of the author calculated in relation to one or more different online content items of the author that were previously published. Where the online content item corresponding to the author is about a first topic, the reputation score can be further based on a previous reputation score of the author calculated in relation to one or more different online content items of the author also about the first topic that were previously published. The author can have more than one reputation score if the author has published online content items about more than one topic. The author can have a first alias relating to the first topic and associated with a first reputation score and can have a second alias relating to a second topic and associated with a second reputation score. The first and second aliases can be related to each other.

The reputation score can include two or more sub-scores, where each sub-score relates to a different quality of the online content item. Determining a reputation score for the author based on one or more reviews of the online content item provided by one or more reviewers can include determining if a reputation score is associated with each of the one or more reviewers. If a reputation score is associated with one or more reviewers, then the reputation score of the author can be based, at least in part, on the reputation score associated with the one or more reviewers.

The reputation score can be reduced if the author is determined to have included plagiarized content within the online content item. The reputation score can be portable from one online publisher to another. Determining a reputation score for the corresponding author can be further based on a pre-existing reputation score of the author imported from a publisher different than a publisher of the online content item.

An identity of the author can be authenticated prior to generating a reputation score of the author. The reputation score can be further based on the length of time an author has been an authenticated author.

Determining a share of revenue for the author can be further based on a number of links to the online content item from other online content. The reputation score can be further based on the number of links to the online content item from other online content.

In general, in another aspect, methods, computer program products and systems are described for authenticating contributors of online content. Online content is received in one or more computers from multiple contributors for public online display. The online content includes initial content and reviews of initial content. An authentication score is determined for a contributor of the multiple contributors. The contributor's name and a representation of the contributor's authentication score is published online in association with online content received from the contributor for display on one or more computers.

In general, in another aspect, methods, computer program products and systems are described for authenticating contributors of online content. A request is received in a computer from a contributor to register as an authenticated contributor. A name and personal information is received from the contributor. A determination is made from a third party source whether the name and the personal information are associated. In response to a positive determination that the name and personal information are associated, the contributor is authenticated.

Implementations of the methods, computer program products and apparatus can include one or more of the following features. Determining an authentication score can include receiving a name and personal information from the contributor and determining from a third party source whether the name and the personal information are associated. Based on the determination, an authentication score for the contributor can be determined. In one example, the personal information is a telephone number, and determining from a third party source includes confirming with a telephone provider that the name and telephone number are associated. Optionally, the contributor can be provided with a token, and the telephone number can be called and the person who answers required to provide the token. In another example, the personal information is a credit card number, and determining from a third party source includes confirming with a credit agency that the name and credit card number are associated. In yet another example, the personal information is an identification number used for tax filing and determining from a third party source includes confirming with a credit agency or the Internal Revenue Service that the number and name are associated.

In general, in another aspect, methods, computer program products and systems are described wherein an online content item authored by an author is obtained in a first computer for public online display. A credibility factor is determined for the author in association with the online content item, where the credibility factor is based on information about the author verified to be true ("verified information"). In response to a query for online content, wherein the online content item is included in a set of search results to the query, the ranking of the online content item in the set is determined in a second computer based at least in part on the credibility factor of the author. The first computer and the second computer can be the same or different computers.

Implementations of the methods, computer programs and systems can include one or more of the following features. Determining the credibility factor can include determining information about the author, and verifying the information about the author to be true. The verified information about the author can include a reputation score for the author and/or an authentication score for the author.

The verified information about the author can be information as to the author's membership in an organization. The credibility factor can be further based on information about the organization. The verified information about the author can include the author's employment for an employer. The credibility factor can be further based on the relevancy of the author's employment to the author's online content item. The verified information about the author can include information about the author's level of education or training in a field. The credibility factor can be further based on the relevancy of the field of the author's education or training to the author's online content item.

The verified information about the author can include the number of other publications of the author that are relevant to the author's online content item. The verified information about the author can include the number of citations to the author's online content item that are made in other publications of one or more different authors. The verified information about the author can include information about awards and recognition of the author in one or more fields. The credibility factor can be further based on the relevancy of the one or more fields to the author's online content item. The verified information about the author can include feedback received about the author or the author's online content item from one or more organizations. The credibility factor can be further based on the relevancy of the one or more organizations to the author's online content item and the feedback received. The verified information about the author can include revenue information about the author's online content item.

This document also discloses systems and techniques for authenticating content and authors of the content. For example, authors of on-line articles may be authenticated so that a reputation score or indicator may be generated for the authors (e.g., based on ratings that other users apply to their articles). Also, comments by users can also be authenticated, so that user may generate reputations as thoughtful commentators or quick on the trigger pundits.

The details of one or more embodiments of the authentication features are set forth in the accompanying drawings and the description below. Other aspects and advantages of the authentication features will be apparent from the description and drawings, and from the claims.

DESCRIPTION OF DRAWINGS

FIGS. 6A-D show example user interface screen shots for linking two or more user-created online documents.

FIGS. 7A-7E show screen shots of a formatted discrete piece of submitted content.

Like reference symbols in the various drawings indicate like elements.

DETAILED DESCRIPTION

Figure 1:
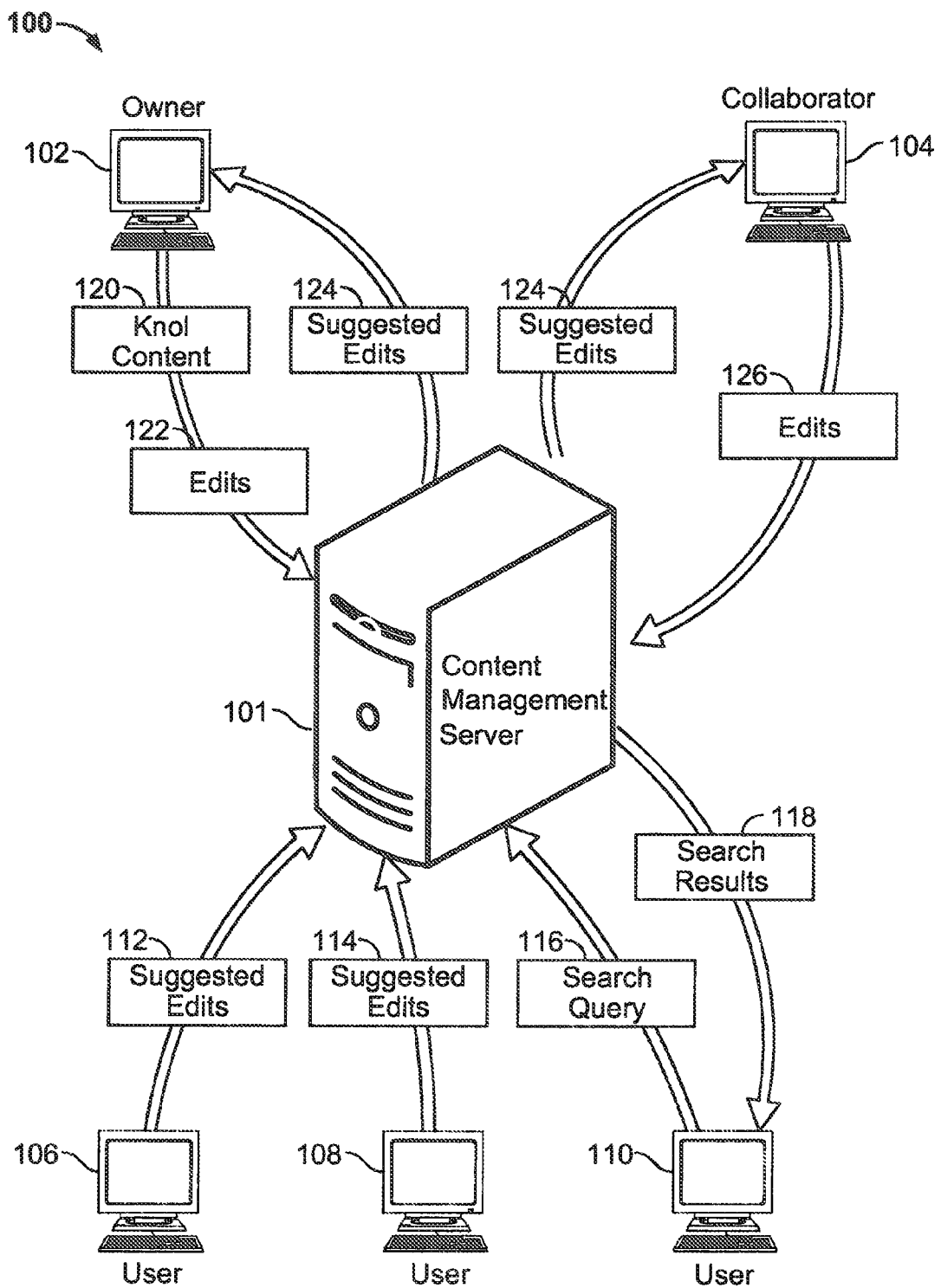
FIG. 1 is a schematic representation of an example system providing a collaborative editing model for online content.

Techniques, methods, apparatus and a system for creating, editing and managing online content are described here. In particular, a collaboration model for editing an online content item is described. In one illustrative example, the online content item is a user-created webpage that attempts to be the "best answer" for a particular topic (which in some implementations could be delivered as a special search result by a search engine). Such an online content item is referred to herein as a "knol" (for a unit of knowledge), although other nomenclature can be used. Such items may also be various other forms of user-submitted content that is available to other users in a community—all of which may be termed a "knol."

Content as described here may be managed and stored by a single organization or may be distributed content. Regarding the former example, one organization may permit submissions of content by multiple various users, and may store such submitted content and permit edits to be made to the content. Such an approach may permit the organization to maintain greater control over the format and consistency of the content, and to better use the content as a search engine corpus. Such an approach may be exemplified by a system such as the GOOGLE KNOL system. Regarding the latter example, content may be spread around various web sites that may act as publishers of content, and a central system may track the location of the content and its authorship, and may also track author reputations (which may be computed in a variety of manners as described below) so as to better direct users to various publishers or content submissions.

The knol can include text, pictures, video, maps, and/or embedded applications. The knol can be owned by an author of the knol. However, other users can be authorized to edit the knol, i.e., collaborators, or to suggest edits, as is described further below. Although the description below is in relation to knols for illustrative purposes, it should be understood that the techniques, apparatus and systems described can be used to collaborate in relation to any text-based online content item.

A knol can be created by an author voluntarily of his or her own initiative, or can be created in response to an invitation to create a knol on a particular topic. For example, a search engine such as the Google search engine available at www.google.com by Google, Inc. of Mountain View, Calif., may display an invitation to a Google user to create a knol that can provide an answer to a query frequently received by the search engine. In one implementation the invention can be triggered when a user inputs a search query into the search engine and the search query has been identified by the search engine as a common query for which a knol is desired. Other trigger events can exist, and the one discussed is an illustrative example.

In one implementation, an author creates a knol using a knol user interface that is hosted by a search engine provider, for example, Google, Inc. Creating the knol through the knol user interface can provide consistency in the manner in which the knol is created. Additionally, the knol can be identified as being a "knol" when presented with other search results in response to a search query received by the search engine. For example, in one implementation, a search result that is a knol has a distinctive appearance in a search result set, and may either be mingled with other search results or identified separately, e.g., in a separate box or otherwise identified as "knol" results.

The knol user interface can provide a page viewer. A knol can appear inside a frame that shows the knol content, the author, contributors (i.e., non-author users that contributed content to the knol) and search and navigation tools can be provided to facilitate use of the knol.

A collaborative editing model can be provided wherein the owner of a knol (i.e., the author), author-designated collaborators and others can contribute edits to the contents of the knol. A knol has a public-facing version, which is a current version that is publicly available for viewing. The owner of the knol is authorized to apply edits to the knol content that effect a change to the public-facing version of the knol. The owner can designate one or more collaborators with permission to also apply edits to the knol content that change the public-facing version of the knol. Other than the owner and the collaborators, no one else can change the public-facing version of the knol. However, others can provide suggested edits to the current public-facing version of the knol. The owner and the collaborators can then decide whether or not to accept or reject suggested edits, as is described further below.

In one implementation, any person who can publicly view the knol content can provide a suggested edit. In another implementation, an entity hosting the knols, for example, Google as described above, can restrict suggested edits to persons that have registered with Google, thereby authenticating, at least to some degree, that the suggested edits are being made by a human being, rather than an automated spider or the like.

The collaborative editing model provides flexible editing capabilities to any authorized editor, e.g., the owner 102 or a collaborator 104. A set of suggested edits accumulates with respect to a first public-facing version of the online content. That is, each suggested edit in the set is an edit to the same base version of the content; the edits are in parallel with one another. After a set of suggested edits provided by multiple different users has accumulated, an authorized editor can review the set of suggested edits and has the flexibility to pick and choose which edits to apply to generate a modified second public-facing version of the online content, subject to conflicts between edits.

By contrast, if the edits are provided in series, meaning that each suggested edit accumulated relates to the base version plus the last received suggested edit, then each suggested edit builds on and is therefore dependent on a previous suggested edit. If such a scenario, if the authorized editor decides to reject a suggested edit, then he/she cannot accepts any downstream suggested edits either, as they were built on the rejected edit. Editing flexibility is thereby curbed. In the system described herein, because the suggested edits all relate to the same base version, the suggested editor is not restricted in what he/she may or may not accept by an earlier decision to reject a particular suggested edit. The authorized editor is provided with a visual notification of the suggested edits as compared to the first public-facing version of the content (i.e., the base version) and is notified of conflicts between two or more suggested edits. Conflict notification and resolution is described further below.

In other implementations, other models for content provision and editing may be used. For example, a user may create content off-line and submit it in a form that they prefer, and the system may convert the content into a form that is consistent with the rest of a collaborative system. Authors may be given a chance to review the content in its converted form and to approve or perhaps edit the converted content. Also, content may also be stored in the system according to format in which a user submits it (e.g., in WORD, HTML, pdf, or other such document formats). In such a situation, a copy of the content, such as in HTML or plaintext form, may be created so as to permit easier searching and manipulation of the content.

Referring to FIG. 1, a schematic representation of an example system 100 providing a collaborative editing model for online content is shown. An owner 102 can provide knol content 120 or other content to a content management server 101. Users of the content management server—for example, users 106 and 108—can provide their suggested edits 112 and 114, respectively, of the knol content 120 to the content management server 101. The suggested edits 112 and 114 can be accessed by the owner 102 and one or more collaborators, e.g., collaborator 104. The owner 102 and collaborator 104 can provide edits 122 and 126 respectively to the content management server 101, thereby modifying the public-facing version of the knol content. A user 110 who enters a search query 116 into the content management server can receive a set of search results 118 that may include the knol content 120 (where the actual search result may include a link pointing to the knoll content), depending on the search terms. In other example systems, the content management server 101 can be replaced by two or more servers, each providing a sub-set of the functionality referred to above.

In the example system shown, only the owner 102 can provide knol content 120. However, in other implementations, the owner 102 can permit others, e.g., the collaborators 104, to provide content as well. The owner 102 can have certain authority that other authors or collaborators are not given, for example, the authority to change ownership, invite/disallow collaborators, publish or unpublish the knol content, permit or deny advertising in conjunction with the knol content, specify the recipients of advertising revenue if advertising is permitted, and/or change the terms of a license of use of the knol content to name a few examples.

An edit includes one or more modifications to the content of a knol and can include a brief explanation of why the modification was made, or other comments about changes to the knol. If a user has authorization to modify the knol, i.e., is an owner or collaborator, then the user's changes to the knol can take effect to the public-facing version immediately. Otherwise, if the user does not have authorization, then the user's edits can be retained as a "delta".

The delta can be placed in a suggested edits module where an owner or collaborator of the knol can review the delta and decide to merge or discard the suggestion. An edit suggestion (i.e., an unmerged delta) does not modify a public facing version of the knol. In other implementations, any user can edit the public-facing version of the knol content, and can access suggested edits received from other users.

In one implementation, knol content can be edited using an inline HTML editor. The functions of the editor include: text editing functions; a display of visual differences (markups) between two versions of a section; and a display of suggested edits.

Figure 2:
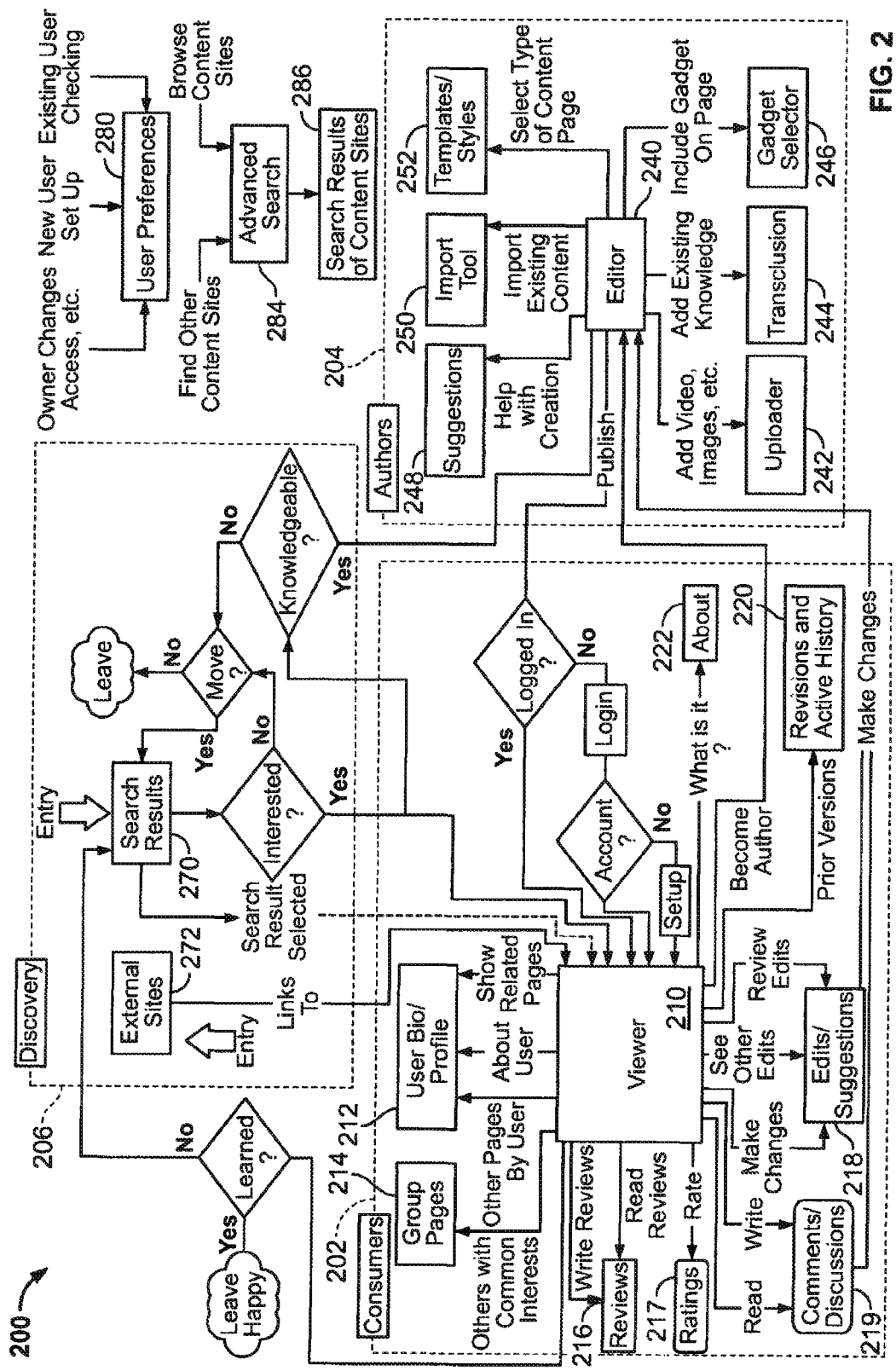
FIG. 2 is a conceptual diagram showing a system for receiving and managing content and comments, ratings, and other input associated with the content.

Referring to FIG. 2, a conceptual diagram shows a system 200 for receiving and managing content and other input associated with the content, such as comments and ratings by users other than the author of the content. Such a system 200 may be implemented using the components shown in FIG. 1 or by other appropriate components. In general, system 200 is an example of a system by which users can be shown particular pieces of content that are related to various topics, and may comment on, edit, rate, or otherwise interact with the content. Certain users, if they feel they have adequate knowledge regarding a topic, may create substantial new content on the topic, such as by authoring a submission (e.g., in the form of a post, article, chapter, or book, among other things) from scratch.

Components in the figure are organized into three main groups conceptually. Within each group, there are interfaces (e.g., web pages) shown as rectangles, features (which generally would not need to be implemented on their own web page and could be include in an existing web page) shown in ovals, and actions shown outside any shape. The actions may represent, for example, commands or desires by a user that will take the user from one page to another or will cause some feature to be invoked on behalf of the user.

Referring to the three groups shown in the system 200, a discovery group 206 represents web pages or other user interface elements, and actions by users, that occur when users are looking for new information on one or more topics. An authors group 204 represents interfaces and actions by which users may offer and submit content to the system 200, such as by submitting articles, posts, podcasts, videos, and other similar content. A consumers group 202 represents interfaces and actions that may be experienced by users who are reviewing content that has been posted or otherwise generated by the system 200. Such consumers may include, for example, users who have previously entered a search request and who select a result that includes a link to content managed by the system 200.

Referring now more specifically to discovery group 206, such a group may represent mechanisms by which various users may achieve entry to a content management system. Two exemplary entry points are shown in this example. First, entry may occur through external sites 272, which may include a variety of internet web sites that point to content managed by the system 200. For example, such sites may contain hyperlinks or other mechanisms for directing users to the content.

In addition, entry may be had by results 270 generated by a search engine. Such results 270 may take a variety of forms. In one example, the results 270 may be like ordinary results listed in response to a search query, e.g., that come from a search across an index of a wide variety of web pages. In yet another example, the results 270 may be from a search corpus that differs from a normal corpus accessed by the search engine. For example, a particular corpus may be reserved for pages that are managed by the content management system 200, such as pages directed to topical content on a variety of topics that are of interest to various users. Such pages may be similar to entries provided with encyclopedias or similar references, including online encyclopedias such as Wikipedia or GOOGLE KNOL. Where the content-based search result is from a special corpus (e.g., is limited to a particular domain), or in other situations, the search result may be formatted in a particular manner, such as to stand out from other ordinary web-based search results. Typical Google search results formatted in a form known as a "one box" are one such example.

Generally, users move from being in a discovery mode, such as when entering search terms, to being in a consumer mode for consuming the content managed by the system 200. Such a transition may occur, for example, as shown by the various arrows in the figure, when a user selects a hyperlink from an external site, when the user selects a search result for such managed content, or when a user otherwise expresses an interest in such content to the system 200. In each such a situation, the FIG. 2 shows flow arrows passing from the discovery group 206 to a content viewer 210 in the consumers group 202. Such process flow causes the content in which the user is interested to be displayed, such as in the form shown below in FIGS. 7A-7E.

Alternatively, the user may continue their discovery or become an author, as shown near the right hand side of discovery group 206. For example, if the user does not express an interest in a content-related search result, they may return and select a different result or may submit a new search query. They may also leave the system entirely, and may be unhappy in doing so. If they do find a topic in which they are interested and they consider themselves to be knowledgeable on the topic, such as by considering themselves to be an expert or a near-expert in the sense that they could communicate their knowledge to others in a beneficial way, they may elect to become an author of content on the subject or topic, which may lead them to the user interface provided by editor 240, which is described in more detail below.

Returning now to users who choose to review content and thus become consumers via viewer 210, a variety of actions may be taken by users that are viewing such content, and such users may be shown a variety of other user interfaces in response to those actions. In one example, as described in more detail above and below, a user may be shown an article or other piece of content on a topic, and may be given a number of options to comment on, rate, edit, or otherwise interact with the content. For example, a user may choose to read or write reviews for a piece of content using reviews interface 216. Such an interface may permit a user to provide an overall impression of a piece of content, similar to the manner in which a shopper may review a product on websites such as Amazon.com, or an author may write a book review.

The user may also choose to rate a piece of content, such as a webpage, using a ratings feature 217. Such a feature may simply permit a user to select a number of stars or other icons, such as on a scale from one to five stars, to express a quality level that the user would associate with the piece of content. The ratings feature 217 is shown in the figure as a rounded box rather than a full rectangle, to demonstrate that such a feature would not ordinarily involve transporting the user to a separate interface, but would instead involve simple interaction by the user through the viewer 210, e.g., selection of stars on a gadget displayed on a web page by the viewer 210.

In a similar manner, a user may use a comments or discussions feature 219 to comment on a piece of content or a portion of the piece of content. Such a feature may be similar in functionality to that provided by reviews interface 216, but would generally involve shorter comments directed toward a particular part of the content or a particular point made in the content, rather than being a review of the entire piece of content. Again, such a feature may be provided in the interface of the viewer 210, such as in a comment area at the end of a posting (see, e.g., FIGS. 7D and 7E).

As discussed above with respect to FIG. 1, users may also provide edits or suggestions for edits to a piece of content, such as a webpage, using edits/suggestions interface 218. Such an interface may permit a user to make suggested changes or edits to a page, to see other edits that may then made to the page by the user or by other users (e.g., with an author or owner of a page controlled the ultimate entry of such edits), and to review edits, such as when an author or other owner of a page wishes to see suggested edits made by others to a page and then approve or disapprove such edits. Where changes or edits are to be made to a page, the user may be taken to the editor 240. Also, a user may choose to become their own author on the topic or on a related topic if they feel they possess the appropriate expertise, and in such a situation, a user may be taken to the editor 240 but be directed to a fresh and blank piece of content (or may start with a particular piece of content that they are to re-form).

Other general functionality may also be provided with respect to viewer 210. For example, an "about" interface 222 may be displayed to a user to explain the manner in which the system 200 receives, manages, and displays content, or may show the user additional information about a particular piece of content, such as information about the author of the content or others who have edited the content. In addition, users of the viewer 210 may be shown group pages 214, which are pages that have been created around topics similar to those discussed on the page currently being viewed by the user, or by (or for) other users with common interests to each other or to the user who is doing the viewing. For example, various pages may be organized hierarchically by topic so that users may more readily browse through the pages to find a specific page that interests them. As one example, one page may be written to explain the basics of high definition televisions, while other pages may be associated with the initial page if they explain details about surround sound, television programming, electronic program guides, remote controls, and the like.

Commonality between users and between particular pieces of content may be determined with the assistance of user bios/profile module 212. Such a module may take a familiar form, and may permit users to enter certain demographic data or other data that may reflect on the interests of the user. For example, the user may enter a profession or hobbies in which they are interested, so that the system 200 may more readily direct them to topics and content related to such interests. In addition, such a module 212 may keep track of various pages or other forms of content created by each user in a familiar manner, so that connections between such content may be more readily determined by other users. As one example, if a particular user is an author that develops a positive reputation within the system 200, other users may wish to review other articles by that same author because they trust that the high quality exhibited in the articles they have already reviewed will be replicated in those other articles. The module 212 may assist in joining the various submissions from that author to each other.

Authors group 204 shows interfaces and features that may be presented to a user when they have exhibited an interest in creating their own content, in a manner that is more than simply providing comments or ratings on the content of other users. The editor 240, which authors may use to enter and format their content, may provide a user interface that takes a variety of forms. For example, the editor may provide features like those provided by GOOGLE DOCUMENTS or other similar word processing applications.

The editor 240 may also accept content that has previously been generated in other forms and may convert such content to a common form or may generate a copy of the content in a common form. For example, if an author submits a PDF file as an example of content, the editor 240 may save the PDF file so that it may be accessed by other users who would like to see the content in its native form as it was created by the author. The editor 240 may also create a copy of the content in a different format such as in HTML format, so that it may be edited, commented upon, or otherwise manipulated by the system 200 in a manner that is familiar to other users and consistent across the system 200.

Authors of content using editor 240 may make use of a number of features or interfaces. For example, a suggestions feature 248 may be selected by a user to obtain help with creating content. The suggestions feature 248 may provide discussions or examples that may help a user create better and more interesting content. For example, the suggestions feature 248 may assist an author with outlining a topic, with adding media items such as images and videos to a topic and with otherwise creating more interesting and better verified discussions in the content. In addition, the suggestions feature 248 may display "best practices" documents to a user, where such documents are considered to be pleasing and well-written, and may permit the user to extract formatting information from such documents to use in their own work.

An import tool 250 may allow a user to more conveniently import content that has already been created, as discussed above. For example, the import tool 250 may present an interface that includes a file manager by which a user can browse for and identify a file on their local computer that they would like to upload to the system 200. The import tool 250 may also provide a number of other features, such as by allowing a user to specify manners in which they would like their pre-existing content to be formatted or reformatted when it is imported into the system.

Templates and styles interface 252 may be accessed by a user to select a format or style for their content, such as from a list of example styles. Such an interface may take a form similar to that provided by various office productivity applications that are pre-loaded with preformatted items that a user may select from, and may then add content to, in order to customize the provided templates. Uploader 242 may simply provide an interface by which a user can identify a file or URL that represents, for example, an image, sound file, or video file that an author would like to incorporate into a piece of content.

A transclusion interface 244 may allow a user to bring existing or future content or knowledge into a piece of content that they are authoring in a variety of exemplary ways. For example, an author may quote from or otherwise reference another piece of content, and the content may be added to a page the author is developing, while a connection back to the originating material is maintained by the system. Such a connection may serve a number of purposes. For example, it may be used as a navigational tool, such as a link, for viewers of the main content to be brought to the referenced content.

Transclusion may also be used to transfer reactions over the citing content to the cited content, such as by providing payment to the author of the cited content when payment is made to the author of the citing content (e.g., in rough proportion to the amount of the second (citing) content that is made up by the first (cited) content), by increasing a relevance score for the cited content with respect to a search engine (e.g., much like the operation of the GOOGLE PAGERANK system applies rankings based on back links from pages to other pages, under the assumption that citation to the first content means that that content is considered relevant by someone), or by otherwise increasing a rating for the cited content (e.g., if many users submit high ratings for the citing article, the cited article may also receive a bump in ratings under the assumption that it bears some credit for the positive user reviews). Transclusion is also discussed more fully below.

Finally, a gadget selector 246 may permit an author to incorporate gadgets on or with their page. Gadgets are generally portable program modules; they are portable in that they can be inserted in a variety of different locations, such as on web pages or on computer desktops. Gadgets often exhibit dynamic content, such as by externally referencing data that is available on the internet. For example, a gadget may obtain current time and temperature data and display it in a pleasing manner, or may show stock prices for a handful of companies selected by a user. Generally, gadgets (which can sometimes be referenced as widgets in various forms) can be authored by anyone with the skill and inclination that can follow a public API, and can be made freely available to the public. Examples of gadgets may be seen with the iGOOGLE product.

Authors may use gadgets to provide a dynamic aspect to their content in a variety of ways. For example, a gadget may report information on the earth's average temperature for the past month and year and may compare such temperatures to historical averages; an author of an article about global warming may wish to include such a gadget at an appropriate point in the article. A similar use may be made of a gadget that tracks the current value of the national debt.

The interfaces and other features shown here may permit a community to be developed as a sort of area on the internet in which high-quality and specific content may be centered. Such a community involves users who are interested in good content, and authors that are able to generate good content. The difference between good and bad content may be moderated by the users (such as by providing ratings) and may quickly be reflected back to the users so that content that the community considers to be of high-quality may work its way quickly to the top of the heap. Various considerations for such a system, and examples of particular implementations of such a system are discussed next.

Figure 3:
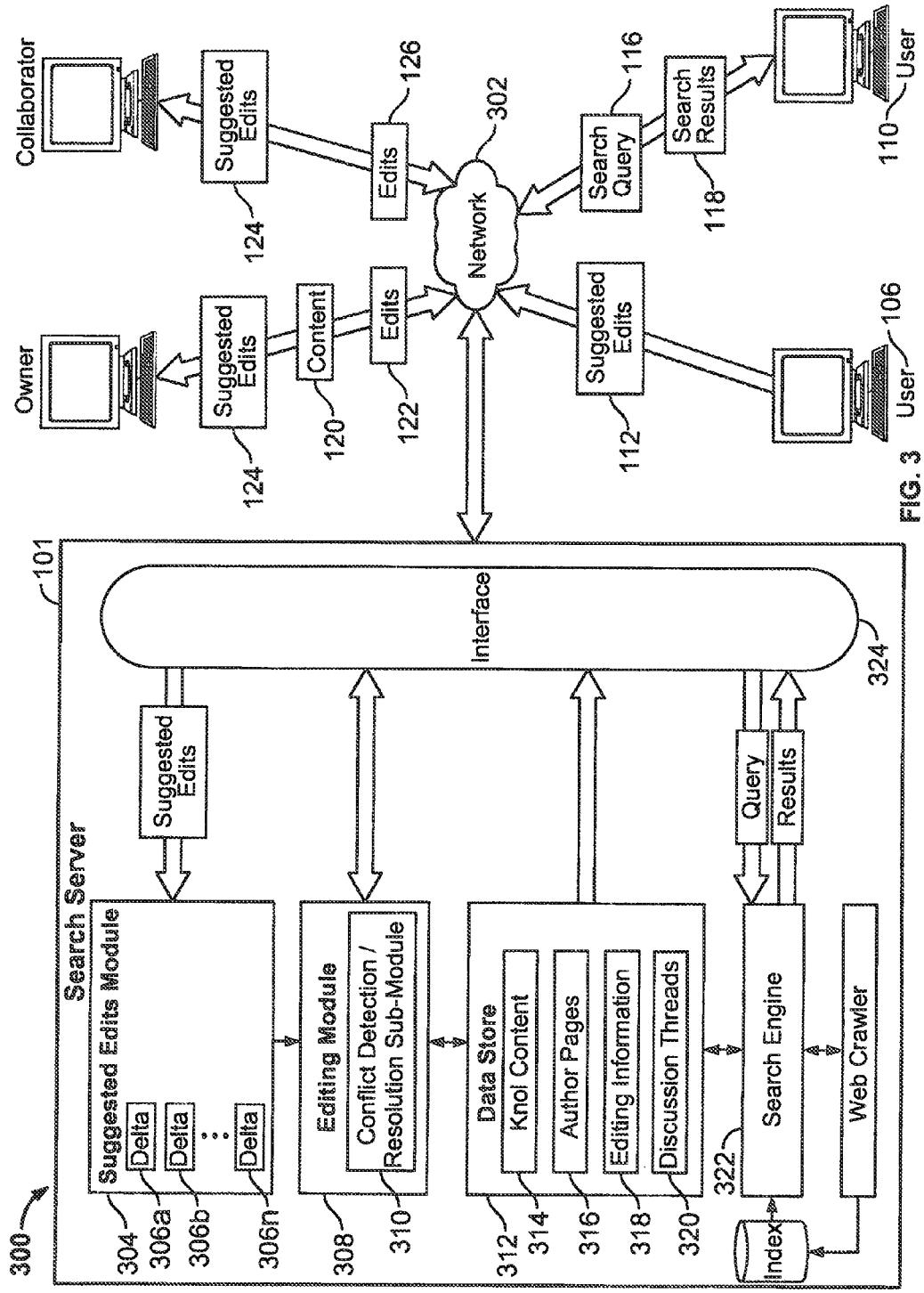
FIG. 3 is a schematic representation of an example content management server providing a collaborative editing model for online content.

Referring to FIG. 3, a schematic representation of the example content management server 101 of FIG. 1 is shown in further detail. The content management server 101 is shown to communicate with the owner 102, collaborator 104 and users 106 and 110 over a network 302. The network 302 can be the Internet, a wide-area network, local-area network, or any other network providing for electronic communication between the parties.

The example content management server 101 includes an interface 324 for communication with the parties over the network 302. The user interface functionality available to one party, e.g., the owner 102, may be different than the functionality provided to another party, e.g., the users 106 and 110, as is described further below. A suggested edits module 304 is provided to store suggested edits provided by user, e.g., user 106. A pending suggested edit is referred to as a "delta", and the suggested edits module 304 includes deltas 306a-n. An editing module 308 provides editing functionality to the owner 102 and any collaborators, e.g., collaborator 104. A conflict detection/resolution sub-module 310 is provided to detect conflicts between two or more deltas and to resolve the conflict, as is described further below.

A data store 312 includes knol content 314 and editing information 318. The editing information 318 can include revisions to the knol content, comments appended to revisions, edit logs and the like. In some implementations, discussion threads 320 can be appended to knol content and included within the data store 312, as is discussed further below. Author pages 316 included in the data store 312 provide information about authors of the knol content, and are described in further detail below.

A search engine 322 receives and responds to search queries, for example, the search query 116 of the user 110. Search results are provided, for example, search results 118 in response to search query 116. If a knol exists in the data store 312 that corresponds to the search query, the knol can be provided within the search results 118.

In other implementations, the functionality provided by the content management server 101 described above can be distributed across two or more servers in electrical communication with the network 302, either directly or indirectly. Other configurations of content management servers 101 and the components thereof can be used, and the content management server 101 of FIG. 2 is but one example.

Figure 4A:
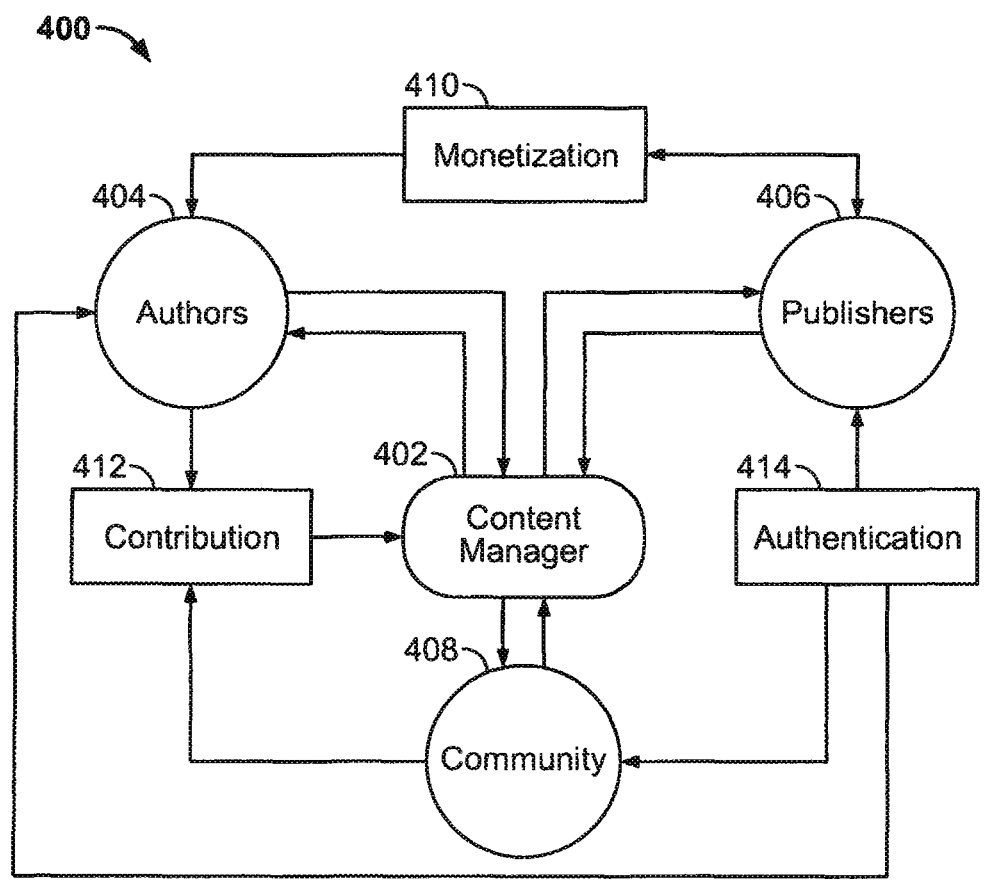
FIG. 4A is a conceptual diagram of an environment in which a content manager may exist.

FIG. 4A is a conceptual diagram of an environment 400 in which a content manager 402 may exist. The content manager 402 may take a form like that shown in the figures above, in that it may permit content submissions from various users and may let other users comment on, rate, and edit or suggests edits for contributions from various authors, among other things. In this representation, the content manager 402 is shown surrounded by three groups (shown in circles) that have a stake in the content manager 402, and three example functions (shown in rectangles) that are performed in cooperation with the content manager 402.

Referring first to the groups, a first group is made up of authors 404. The authors 404 are creators of original content, as described above. Authors may develop content from scratch on an empty page, or may borrow from content developed by other authors. For example, an author may quote or link to writings by other authors, and may also invite others to be co-authors. In one example, an author may establish a collection of works and invite others to write portions of the collection, much like an editor of a technical volume might organize individual chapters that are each written by a different contributor. Authors generally seek recognition for their work, and may also seek more concrete forms of reward such as money.

To that end, authors may be registered with and authenticated by the system 400. For example, the system 400 may require logins by users and may associate users with accounts. The accounts may keep track of content submitted by individual users, comments made by users, and other similar tracking of information. Such information may be used to generate reputation scores or indicators for users such as authors. For example, ratings provided by various users for an author's submissions may be used to rank the author in terms of quality. Such rankings may be shown to users so that they can more readily judge the perceived quality of an author (and authors may be assigned to various levels based on the rankings, e.g., silver, gold, and platinum), may be used as an input to a search engine in determining where to rank content of authors when the content is responsive to a search request, and to provide compensations (including monetary compensation) to authors. Each of these points is described in more detail below. Particular features for providing author rankings and for rooting out fraud in such rankings are disclosed in pending U.S. Patent Application Ser. No. 61/005,482, filed Dec. 4, 2007, entitled "RATING RATERS", which is hereby incorporated by reference in its entirety.

Publishers 406 may manage the organization and development of content in cooperation with authors. Publishers may take traditional forms such as book publishing houses or record labels, but in this example may be organizations that are taking advantage of opportunities for digital publication and distribution of content. Publishers may, according to traditional goals, seek to make content in a particular subject area available to the public in return for some sort of monetary or other reward. For example, a publisher may host a web site for political columnists and may run advertising on that web site, similar to advertising generated by the GOOGLE ADSENSE system, to produce revenue for its operation. The publisher may in turn share some of the revenue with authors whose work are published on the site, in order to induce more and better-qualified authors to submit content to the publisher.

The system 400 may help such publishers, such as by driving consumers to the publishers' web sites, and by helping the publishers more fairly compensate its authors. For example, by keeping track of author reputations and sharing such information with the publishers, the content manager 402 may help the publishers better understand what, and which authors, is driving visitors to a site, so that those important authors may be more highly compensated than are other authors. In addition, content manager 402 may be associated with a payment system, such as a publicly accessible micropayment system, and may thus permit publishers to more easily seek payment from consumers (where the publisher's economic model is based at least in part on paid content) and may make associated payments to the authors for the publisher.

The community 408 may take a variety of forms and the system 400 may provide a variety of services to the community 408. In general, the community will include various authenticated users who are interested in viewing content from the system. The content manager 402 and/or the publishers 406 can take part in authenticating and/or verifying an authentication (414) of a user in the community 408 and the authors 404.

Unauthenticated users may be allowed into the system also, but may be prevented from ranking content, commenting on content, or editing content. Such a restriction may be imposed to prevent rogue users from making improper edits and from giving authors dishonest rankings (e.g., because of personal animosity to an author, because of a close friendship with an author, or out of pure spite), and may permit better tracking in the system (e.g., by providing reputation scoring for edits and comments in addition to pure authorship, to normalize a user's ranking of a particular author base on other of the user's rankings (e.g., perhaps the user is too "nice" or too "mean" when ranking), etc.).

In short, the roles include a publisher such as a business owner charge with running a publication and getting visibility for the publication, multiple content creators who write articles or contribute other content to the publication and want to be recognized for their contributions, and a community of users that maintains the quality of the publications by their reading the content and participating in judging the quality of the content. The system's functions of contribution, authentication, and monetization will be described next.

Contribution and Reputation

User contributions may take multiple forms, such as reviews, comments, and ratings. Such contributions may be aided by content generation tools such as BLOGGER, PAGE CREATOR, GOOGLE DOCUMENTS, and JOTSPOT, as examples. Publishers may organize content through various webmaster tools that are publicly available. Publishers may, for example, organize around vertical-specific community database that center around particular topic areas (e.g., technology, health, travel, etc.)

Each type of contribution may be used in a variety of ways to affect the base content to which the contributions are directed. As one example, ratings may be applied to the content, and average ratings for particular pieces of content may be determined. Such ratings may then be transmitted to the authors of the content, and the authors may in turn be rated. For example, an author may be given an overall rating that is a weighted average of the pieces of content the author has produced (perhaps with ratings deemed to be unreliable or fraudulent removed). An author may also have such a score fed into a more comprehensive reputation rating process, which may take into account scores provided within an on-line community and other factors. For example, "famous" authors may be put in a different group or have their scores elevated, such as if they won a Pulitzer prize or similar award (e.g., for poetry or the like). In some implementations, fame can be estimated (or proxied for) by many factors including, for example and without limitation: mentions of the author in a web index (e.g., the Google index); mentions of the author in certain publications (e.g., magazines or news papers that frequently carry articles about celebrities); the rate of appearance of the author's name in query logs for certain websites (e.g., news.google.com, www.google.com, news.google.com/archivesearch); and/or the number of links to a blog owned by the author.

Also, certain publishers (e.g., the New York Times) may establish themselves as hiring, or publishing the work of, only accomplished authors, so that authors published by such organizations may be given a higher reputation score. Such publishers may be deduced also, such as by determining that the average rankings for articles on a certain site are very high, and thus that an author who manages to publish on such a site must have some technical capabilities.

Users who submit reviews and comments, a form of derivative authorship, may also be assigned reputation points or indicators based on such authoring contributions, and a user's overall reputation score may be a combination of normal authorship and derivative authorship—where normal authorship may be weighted more highly. Also, a reputation may be a factor dependent on the amount of time that a user has been in a system, and the level of activity of the user within the system. For instance a user whose contributions average a rating of 3.0 from other users but who has made hundreds of contributions over many years, may have a substantially higher reputation score than does a user with an average of 3.0 from a handful of readers on a single submitted article.

Figure 4B:
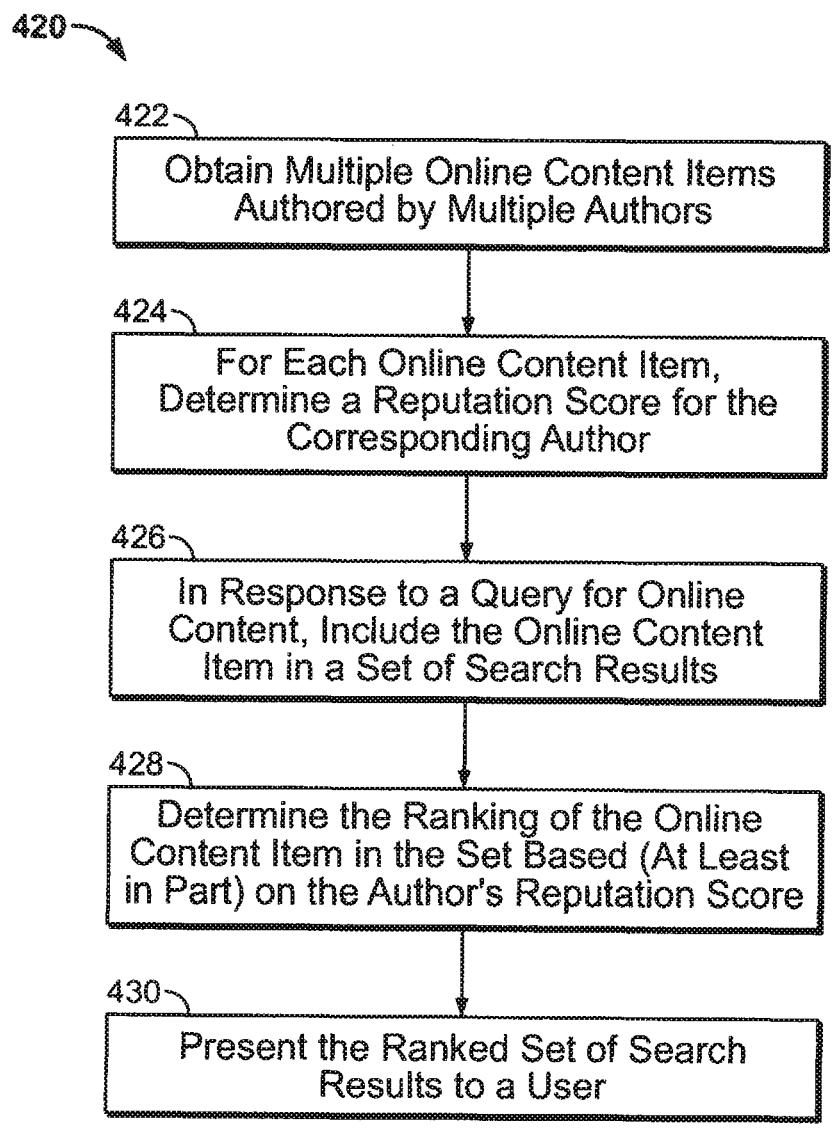
FIG. 4B is a flowchart showing an example process for using an author's reputation score when ranking an online content item of author.

FIG. 4B is a flowchart showing an example process 420 for using an author's reputation score when ranking an online content item of author. Multiple online content items authored by multiple authors are obtained for online publication (Step 422). For example, in some implementations, the multiple online content items can be obtained by the content manager 402 from the authors 404, as shown in FIG. 4A. For each online content item, a reputation score is determined for the corresponding author (Step 424). The reputation score can be based on one or more reviews of the online content item provided by one or more reviewers other than the author. For example, in some implementations, the one or more reviewers are members of the community 408 and/or the authors 404, shown in FIG. 4A. In response to a query for online content, where the online content item can be included in a set of search results (Step 426). The ranking of the online content item in the set can be determined, at least in part, based on the reputation score of the author (Step 428). The ranked set of search results can then be presented (e.g., displayed on a computer) to a user providing the search query (Step 430).

In some implementations, users may have multiple reputations. For example, a user may have a different reputation for original content than they do for derivative content. Also, a user may have different reputations for different topics. For instance a nuclear physicists may have a very high reputation for articles she writes regarding relativity, but may have a very low reputation for articles she authors about home theatre systems (if she has a dead ear). In such a situation, the user could self-categorize their expertise in an attempt to prevent their weak skills from watering down their rating. Such categorization could occur by the user authenticating under two different aliases, which the system may track as being related to each other, or by identifying different fields that should not have reputations scores transferred between them (but where the user has a single on-line persona).

Reputations may also be judged across a multitude of factors. For example, a user may have an overall reputation for quality writing. The user may also, however, be assigned a reputation indicator for the quality of their thoughts, the technical quality of their writing, and for other parameters that may be of interests to members of a community. In certain implementations, a parameter such as technical writing skill may be judged across all topics on which an author has written, while other parameters like grasp of the subject matter, may have their scores isolated into particular bins. For instance, if our nuclear physicist from above is a horrible writer, a brilliant scientist, and a home theatre hack, the science community may not care about her home theatre problems, but may want to know about her problems with grammar.

In addition, the reputations of particular authors may be used to adjust the reputations of other authors. For example, if Stephen King (who presumably knows his stuff, as the author of On Writing) gives 5 stars or a similar high ranking to another author, the reputation of that other author will increase more than it would if an unknown with a small reputation did the same. In essence, the ranking of an author would depend on the rankings provided by other authors, and would depend in particular on the rankings of those other authors, where ranking by authors would be weighted according to the level of their own reputations (and their reputations would in turn be modulated, at least in part, by the rankings they receive from other authors)—in effect a PAGERANK-like technique applied to author reputations. Such reputation indicators may then in turn be used to score web pages in search results (e.g., if a highly-ranked author gives a high score to a page, its search position will rise), along with other traditional factors such as PAGERANK scores, click-through rates, ratio of good scores, and spam scores. In some implementations, the authors reputation score can be influenced by the web page score attributed to web pages where the author's online content is published, which web page score can be determined using traditional factors as discussed above or by other techniques.

Such reputation scores may also be portable, at least where authors are properly authenticated. In particular, an author may take his or her reputation with him or her when they write for various publications—because the system can track the reputation regardless of where the author is publishing. As a result, authors may more readily publish on a variety of topics with publishers that match those topics (e.g., George Will can write for a baseball web page and for a political web page), and can also use their reputations to help drive consumers to such other locations, and by extension, to increase the amount that publishers will pay them for their work.

In addition, copied contributions may be tracked more easily in such a system. Known plagiarism identification techniques may be used to identify authors who have copied content from others. For example, content may be date stamped when it is first submitted to a system, and content that is very similar may be flagged as a potential problem. Such situations may then be pulled into a dispute resolution process, where the putative originating author and the suspected copyist may state their cases. Other users (such as authors who have been part of the system for a long time and have high reputations) may then decide who is correct. Users found to plagiarize or have other harmful conduct (e.g., flaming, inappropriate comments, etc.) may have their reputations lowered, thus resulting in lowered rankings for their work and less traffic by other users to their work.

Techniques may also be taken to help "mainstream" such content. In particular, there is often a real lag time before new content begins to be reported at an appropriate level by search engines. That is because search engines often depend on references by certain pages to other pages—when a page is brand new, no other page references it and is score may be low as a result, even if it is the best page in the world. Where separate content is pulled aside in the manners discussed here as being content that should be authoritative on a topic or at least a decent summary of a topic, it may be flagged for separate treatment. For example, it may be crawled more often so that its presence will be recognized more quickly. Also, its search scores may depend more on ratings from users than on ratings from other pages in the form of incoming back links. As such, the prominence of the content in a search result can rise quickly as users find it, and need not wait for other web publishers to find it and link to it.

Contribution may be initiated, encouraged, or "seeded" by a number of methods. For example, a central organization may initially commission authors to write articles on important or central topics. Such articles may then encourage community members to add new articles around the edges of the main article. Alternative, extracted or licensed content may be obtained, and then organized to fit the desired format. Particular topics to address in the initial seeding may be determined by reviewing logs of user query sessions to find search terms that led to unsatisfied users (e.g., where users abandon a search without spending any substantial time at any search result, or try a modified search request). Also, a system that lets user pose questions may serve as a further source of topics on which content is needed.

Authentication

Tracking user reputations can depend in large part on authentication of users in a community. Once users are initially authenticated, such authentication may be maintained by various standard mechanisms such as log in credentials (e.g., user name and password). To initially authenticate a user, i.e., to determine that they are who they say they are, various mechanisms may be used. For instance, for certain prominent authors, the system may initially contact the author and provide them with a unique (or effectively unique) token that the author can use to register with the system. As one example, the e-mail addresses or telephone numbers of reporters at a particular newspaper, magazine, or other publisher may be accessed from publicly available sources. Such reporters may then be contacted via e-mail or telephone. In the example of e-mail, the reporter may be given a unique token and a URL directed toward the system. The user may select the URL and then enter the token information at a web site. No other user should have the token information, so the user can be authenticated in this manner. The reporter may then enter additional information to be kept in a profile of the reporter. Subsequent access by the reporter to the system may be by a user name and password selected by the reporter, and the reporter may be authenticated in that manner. Similar authentication may occur by calling the reporter and letting her pick a user name and password (which a technician on the telephone call would then enter into the system). In some implementations, a non-user initiated authentication technique is granted a higher authentication score than a user-initiated technique.

Authentication may also be initiated by the user. In one example, a user may provide a telephone number when they initially seek authentication. A system may then compare that telephone number to publicly available information (e.g., performing a reverse look-up to match the name supplied by the user to the number supplied by the user), comparing the number to a location of an IP address associated with the user's submission, and the like, to verify that the number and user are associated. The system may then present the user with a token, dial the verified telephone number, and ask the person who answers the telephone number to enter the token. Such an authentication technique may at least do a good job of tying the user to the verified telephone number, which make the person much less likely to be an impersonator, and may also filter out a number of other attempts at deception.

In other implementations, the user can be provided the token by way of a text message sent to the verified telephone number and can be required to re-submit the token, e.g., by entering it into a form on a webpage or by telephoning a number and repeating the token. In other implementations, the user can be provided the token by mail, where the token is mailed to an address that optionally has been previously verified as associated with the user. The user can then be required to re-submit the token, e.g., by entering it into a form on a webpage or by telephoning a number and repeating the token.

In other implementations, "out of wallet" identification can be used in the authentication process. Out of wallet refers to using data that is not available easily to persons apart from the user, who would know this information but is not likely to carry such information in his/her wallet. This type of out of wallet data can be accessed through certain databases, but is not generally publicly available, e.g., to an impersonator. A user can be requested to provide out of wallet data, e.g., over the telephone after being called at the verified telephone number, or by filling out a form on a webpage, or otherwise.

The system may also use domain information in a user's supplied e-mail address (which may be checked via a challenge-response interaction) to help authenticate the user. For example, if a user claims to be a NASA employee when submitting profile information for authorship, the fact that their e-mail address ends in nasa.gov would be an indicator of authenticity.

Also, an organization such as GOOGLE, EBAY, or AMAZON.COM may have developed a historical relationship with a user by the fact that the user has been part of their community for a long time. The existence of such a relationship, where the user has abided by the policies of the community, may also be used as a signal to authenticate the user.

An indicator of the authentication confidence for a user may also be provided. In particular, a number of authentication techniques like those discussed above may be used to authenticate a user. For each technique that returns a positive authentication, the strength of the authentication may be better, and the user may receive a correspondingly high authentication score, which may be displayed to other users who are interested in whether the user is who they say they are. Such a score may subsequently be affected by a number of other factors, which may or may not be weighted. For example, if a user remains a member in good standing in a community for a long time, their authentication score may rise. In contrast, if other users (and in particular other users who have high reputations) question the actions of a user or the authenticity of the user, the authentication score may fall.

Some authentication techniques are prone to false negatives. For example, when attempting to associate a user name with a credit card number, false negatives can result if a credit card brand is not supported by the agency being used for verification or if the user's name provided differs (even slightly) from the name registered for the credit card number. Additionally, it is conceivable that telephone call-back may not be successful, for example, if a telephone carrier is unsupported. To compensate for such known false positives, in some implementations a user can be awarded some minimal authentication score for attempting to authenticate. For example, depending on the known robustness of a particular authentication technique and the known false negative rate, the user may be awarded some points toward their authentication score for repeated yet failed authentication attempts, on the premise that a legitimate user will try authenticating several times with the same credentials before giving up.

In some implementations, the calculation of an authentication score can be a weighted sum where each constituent has a maximum possible score contribution on a point scale. The constituents can be: (1) whether there has been a successful authentication attempt and what technique was used; and (2) whether there were failed authentication attempts and is so, the number of failed attempts, the technique used and whether the user provided the same credentials for each attempt.

Figure 4C:
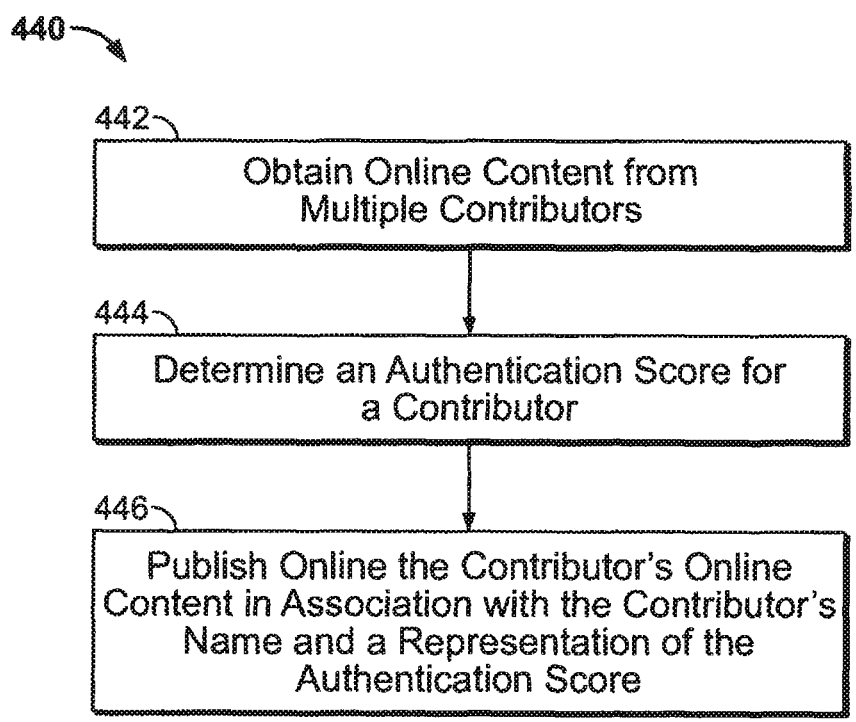
FIG. 4C is a flowchart showing an example process for authenticating an author.

Referring now to FIG. 4C, a flowchart shows an example process 440 for authenticating a user. Online content is obtained, in one or more computers, for public online display, e.g., from multiple contributors (Step 442). The online content includes initial content and reviews of initial content. In some implementations, a system 400 such as that shown in FIG. 4A can be used to implement the process 440. In such an example, the online content can be received by the content manager 402 from authors 404 and users in the community 408. An authentication score is determined for a contributor of the multiple contributors (Step 444). Referring again to the above example, the content manager 402 can determine the authentication score.

In some implementations, determining an authentication score includes receiving a name and personal information from the contributor. A third party source is used to determine whether the name and the personal information are associated. For example, if the personal information is a telephone number, then a telephone provider can be contacted to verify that the name provided and the telephone number are associated. In another example, if the personal information is a credit card number, a credit agency is contacted to determine if the name and credit card number are associated. In yet another example, if an identification number for tax filing is provided (e.g., a SSN or TIN), a credit agency or the Internal Revenue Service can be contacted to determine if the name and identification number are associated. Other examples are possible, and the ones recited here are for illustrative purposes. Based on the determination of the name and personal information being associated or not, an authentication score for the contributor is determined. The contributor's online content is published online for display on one or more computers with the contributor's name and authentication score (or a representation of the authentication score) included in association with the online content (Step 446). For example, the online content can be published by a publisher included in the publishers 406.

In reference to Step 446, although an authentication score may be determined, the score itself may or may not be displayed. In some implementations, a representation of the authentication score is displayed, some illustrative examples of which include a graphical badge shown along with the contributor's name or a number of stars. In some implementations, the authentication score is implicitly represented, for example, by the contributor's ranking in a ranking of "top contributors" or "leaderboards".

Credibility Factor

In some implementations, a credibility factor can be determined for an author of online content item. The credibility factor can be associated with the particular online content item. That is, if the author has authored multiple online content items, the author can have multiple credibility factors, which may be different. By way of illustration, the author may have a relatively high credibility factor for online content items written in the subject area of root canals, particularly if the author is a dentist, but may have a lower credibility factor for an online content item written in the subject area of muscle cars. The credibility factor, or a representation thereof (e.g., a graphical symbol) can be displayed for online publication in association with the author and/or the author's online content item.

In some implementations, the credibility factor is calculated by one or more computers, e.g., without human intervention. In other implementations, where human operations are included in the process of calculating the credibility factor, the credibility factor is determined by a computer by receiving user input specifying the credibility factor or otherwise retrieving the credibility factor or information that can be used to then calculate the credibility factor.

The credibility factor can be used, at least in part, in determining the ranking of the online content item in a set of search results. The credibility factor is determined based on information about the author verified to be true (referred to herein as "verified information"). Various types of information about the author can be used and each can have varying effects on the author's credibility factor. The following are some illustrative examples of types of information, and how they can be verified, that can be used alone or in combination, to determine an author's credibility factor. In some instances, the author is required to provide verification of the information about him/herself. In other instances a third party source can be contacted, either manually or automatically, to verify the information.

If the author is an authenticated user belonging to a community of users supplying and reviewing online content items, for example, the community 408 shown in the system 400 of FIG. 4A, the length of time the author has been an authenticated user can influence the author's credibility factor.

If the author has an associated authentication score, as is discussed above, the authentication score can influence the author's credibility factor. Whether or not the author has an authentication score per se, one or more of the factors discussed above that can impact the author's authentication score can also be considered when determining the author's credibility factor.

If the author has an associated reputation score, as discussed above, the reputation score can influence the author's credibility factor. Whether or not the author has a reputation score per se, one or more of the factors discussed above that can impact an author's reputation score can also be considered when determine the author's credibility factor. By way of illustrative example, if the author has a reputation of giving high or low quality feedback on reviews, websites, etc., the author's credibility factor can be influenced. If the author has a reputation of providing high or low quality original content, the author's credibility factor can also be influenced.

Information about the author can include whether the author is a member of an organization. Whether the organization is known and/or credible and/or has licensing requirements (e.g., a professional organization requiring a license to practice medicine, law, etc.) can also influence the author's credibility factor. Verifying the author is a member of the organization in and of itself can influence the credibility factor, since it goes toward confirming the author is a real person who exists. The validity of the organization itself and whether or not it is relevant to the topic of the online content item additionally can influence the credibility factor. If the organization requires members to have a license (e.g., to practice law or medicine), this can further influence the author's credibility factor, since such organizations typically establish and police minimum requirements for licensing in terms of ethics, knowledge and the like.

The information about the author can include the author's employment (past or present) and whether or not the employment is in a field related to the topic of the online content item. Verifying the author is an employee of a particular employer can influence the credibility factor, since it tends to confirm the author is a real, existing person. Whether or not the author's employment is in a field related to the topic of the author's online content item can further influence the author's credibility score. For example, if the author writes an online content item about food safety inspection practices and is found to be employed as a food inspector at a well known food supplier, the verification of employment can positively influence the author's credibility factor. By contrast, if the author was determined to be a mechanical engineer employed in the oil and gas industry, the verification of employment may have a neutral or negative influence on the author's credibility factor.

The information about the author can include a degree or other certification of education or training. Whether or not the author holds the degree or certification claimed can be verified and can influence the author's credibility factor. The relevancy of the author's education or training to the author's online content item can also be used to influence the credibility factor. The credibility of the institution granting the degree or certification can also influence the author's credibility factor. For example, whether or not a university is accredited, where the university or college ranks and whether or not the institution has a focus on a subject matter relevant to the author's online content item are all considerations that can influence the author's credibility factor.

If the author has published more than one online content item, the percentage and/or volume of the author's other published online content items that are relevant to the online content item under consideration can influence the author's credibility factor.

If the author's online content item is cited by one or more other authors, this can influence the author's credibility score. For example, if the author has been cited by other authenticated authors, or authors with high credibility factors, the author's own credibility factor can be positively influenced. Whether or not the other authors citing the author's online content item are well-known in the same topic as the online content item can also influence the author's credibility factor.

If the author has received awards or other forms of public recognition in the topic area of the online content item or for the online content item itself, the author's credibility factor can be positively influenced. If the author's online content item is published by a publisher that regularly publishes works of authors who have received awards or other public recognition, thereby increasing the credibility of the publisher itself, the author's credibility score can be influenced.

If the author has co-authored the online content item, the credibility of the co-authors can also influence the author's credibility factor. For example, if the co-authors are all well known and respected in the industry related to the subject matter of the online content item, the author's credibility score can be positively influenced.

If the online content item receives positive feedback from relevant organizations, for example, is recommended by a consumer, business, government, hobby or professional organization, the author's credibility factor can be positively influenced.

The level of success of the author, either in relation to a particular online content item, or generally, can be measured to some degree by the success of the author's published works, for example, whether one or more have reached best seller lists or by revenue generated from one or more publications. If this information is available and indicated relative success of the author in a particular field, this can positively influence the author's credibility factor.

As mentioned above, in some instances, the author is required to provide verification of the information about him/herself. In some implementations, the author can be provided a questionnaire where the author must answer certain questions to provide information about his/herself. The questionnaire can be provided electronically, for example, in an email, text message or by way of a website, e.g., in response to the author publishing (or requesting to publish) the online content item to the website. Certain of the questions may require the author to also provide verification of the answer. For example, if the author is asked if they have a university degree and they answer yes, the author may be requested to provide a scanned copy of the degree, a certified copy of his/her transcripts from the degree-granting institution, or authorization for the degree-granting institution to provide verification directly to the party generating the author's credibility factor.

In other instances a third party source can be contacted, either manually or automatically, to verify the information about the author, and the information can be obtained either directly from the author or indirectly. By way of example, by crawling a webpage including a publication of an author's online content item, the author's name and potentially other information about the author can be determined. Inquiries can then be made (automated or manual) to organizations, educational institutions and/or other sources of information to gather information about the author. For example, one or more organizations can be contacted to determine whether or not the author is a member. As another example, one or more educational institutions can be contacted to determine whether or not the author attended the institution as a student.

Telephone directories can be queried to determine an address and telephone number of an author, which information can then be useful in further searches, for example, to narrow a search to a geographical area. Online content can be crawled or otherwise searched to look for any references to the author and/or the author's online content item. The above queries can be made with or without the assistance of the author. Queries to determine information about the author, or to verify information already determined about the author, can be automated without human interaction, with the assistance of one or more human operators, or by a combination of the two.

Figure 4D:
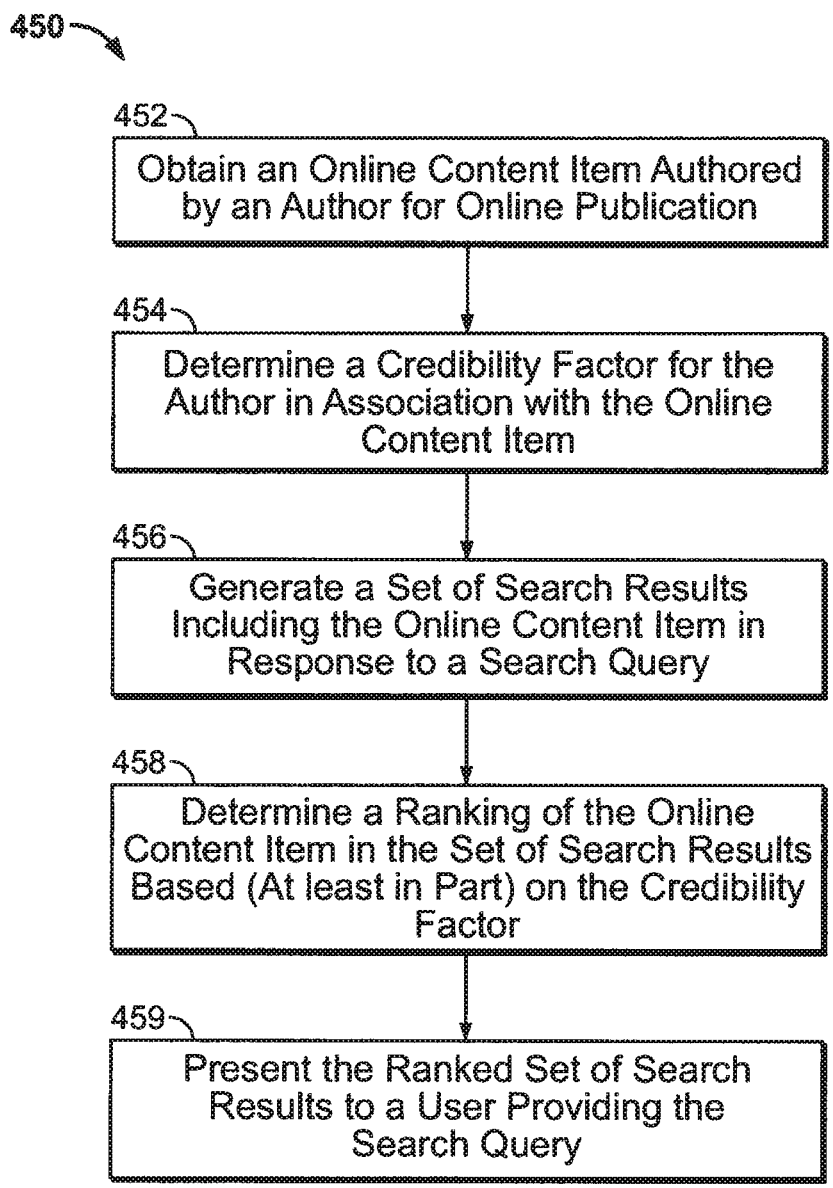
FIG. 4D is a flowchart shows an example process for using an author's credibility factor when ranking a set of search results.

Referring now to FIG. 4D, a flowchart shows an example process 450 for using an author's credibility factor when ranking a set of search results. An online content item authored by an author is obtained for online publication (Step 452). For example, in some implementations, the online content item can be received by the content manager 402 from the one of the authors 404, as shown in FIG. 4A. In other implementations, the online content item authored by an author is obtained from a document repository, retrieved from the World Wide Web (e.g., from a web crawler), or retrieved from a library of digitized data (e.g., scanned books and/or articles), to name some illustrative examples. The nature of the online content item can be varied, and examples include: content on a webpage; an article; a scanned book; a commentary on an article, book or otherwise. For the online content item, a credibility factor is determined for the author (Step 454). The credibility score is based on verified information about the author. In response to a query for online content, a set of search results is generated that includes the online content item (Step 456). The ranking of the online content item in the set can be determined, at least in part, based on the credibility factor of the author (Step 458). The ranked set of search results can then be presented to a user providing the search query (Step 459).

Referring to Step 452, obtaining an author's online content item can be performed in a number of ways. In some implementations, the author submits the online content item, e.g., over a network, to a computer where the online content item is received. In other implementations, the online content item is obtained at a first computer from a web crawler that retrieved the online content item over the World Wide Web. In other implementations, the online content item is received at a first computer over a network from a document repository. For example, the online content item can be a book or article that has been scanned into an electronic format and published online by a publisher or included in a library of similar content items. The above are just some examples of how the online content item can be obtained, and other techniques are possible.

Monetization

Monetization or rewards from such a system may take a number of forms. For example, where a system is associated with a search engine, the rewards may take the form of prominence in search results.

One main source of monetization may come from targeted advertising. In particular, pages may be provided with areas in which advertisements are displayed. Display of or user selections of the advertisements may trigger an ad payment event, and the content manager who places the ads may be compensated according to a pre-existing agreement by the advertiser. The content manager may then pass a portion of the compensation to the publisher (i.e., the operator of the page on which the ad was placed). The particular ads may be selected so as to match the content of the pages. The GOOGLE ADSENSE system is an example of such an ad placement system.

Also, authors or publishers may be rewarded by being provided privileges or credits with various services. For example, certain authors may also be trying to sell a product, and may wish to advertise that product. As a result, such authors may request advertising credits from an organization like GOOGLE. As one example, a home audio magazine may submit a number of informative articles on the basics of setting up a home theatre. Users who visit the page may click on advertisements for home theatre gear, and the magazine/webpage publisher may be granted advertising credits that it can use to promote its magazine. In short, the magazine publisher may recycle certain content so that it can easily obtain money to promote its new, paid content. The particular level of payout, as when payout is in cash, may depend on the reputation of the publisher, author, and/or content.

Monetization may also come directly from consumers. For example, consumers may keep an account with the content management organization (e.g., GOOGLE) and may make payments as they encounter and choose to read particular pieces of content. The content management organization can then split the proceeds with the publisher and/or the author(s) in a manner like the splitting of advertising revenue discussed above. In one example, the content management system may track a substantial number of publishers and provide access to users under a subscription model, where the subscription proceeds are split among the publishers according to the level of access that was made of their particular pages.

Also, users may be provided with search results for paid content and may be shown a portion of the paid content for free. They may then be shown the cost of receiving the full content and may choose to have their account debited for that amount before being shown the full content. In this manner, users may determine whether the content is something they want, without having to pay anything, and may pay only when they actually get the useful information. Also, access to the detailed information may be conditioned on the user logging in and identifying themselves to the system.

Such payment from users may occur by applying a charge to a credit account of the user (e.g., a submitted credit card)

or by taking a set amount from the user and then drawing that amount down as the user accesses content. Such payments may also occur using a mechanism such as a GOOGLE CHECKOUT shopping cart, where the user can select the content they would like and then choose to pay for its using standard mechanisms.

Figure 5:
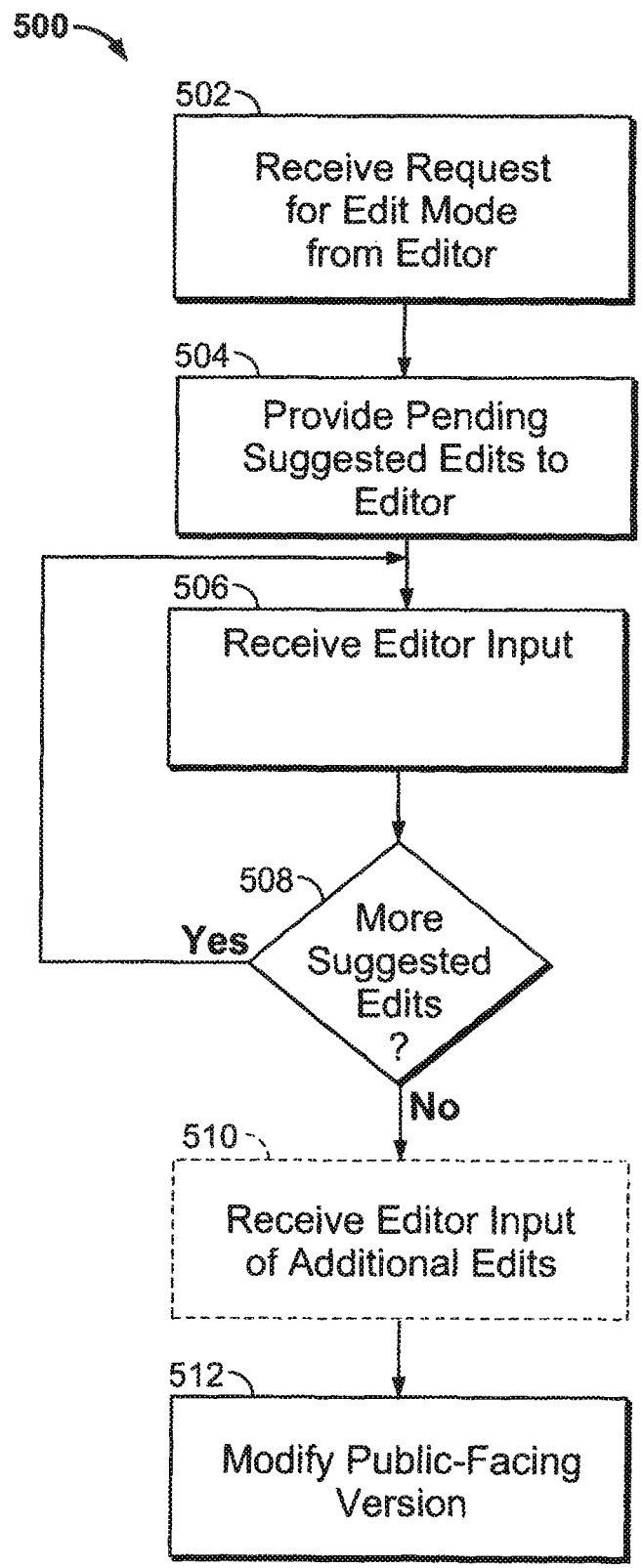
FIG. 5 is a flowchart showing an example process for collaboratively editing online content.

Referring now to FIG. 5, an example process 500 for an owner or collaborator of a knol to review suggested edits and modify the contents of a knol is shown. The owner or collaborator enters into an edit mode with respect to the knol (Step 502). For example, a knol user interface can be provided to view the knol, and an "edit knol" control can be selected by the owner or collaborator. The owner or collaborator can then be requested to enter a user name and password, or otherwise identify themselves, such that they can enter the edit mode with the appropriate access entitled to them on account of their status as an owner or collaborator.

The owner or collaborator is provided with all suggested edits that are currently pending with respect to the current public-facing version of the knol (Step 504). That is, any suggested edits that were input by others since the owner or any collaborator last entered the edit mode and changed the public-facing version of the knol are presented, as well as any suggested edits that were carried over from a previous version, which shall be discussed further below.

The owner or collaborator can view the suggested edits, for example, in the order in which they were received. For each suggested edit, the owner or collaborator can select to accept the suggested edit, reject the suggested edit or hold the suggested edit (i.e., neither accept nor reject) (Step 506). The suggested edits can be presented to the owner or collaborator in a mark-up mode, for example, showing deletions as strike-outs and additions in bold, underlined and/or in a contrasting color. The mark-up shows the differences between the suggested edits and the current public-facing version of the knol.

Once there are no further suggested edits to review ("No" branch of decision step 508), the owner or collaborator optionally can input additional edits of their own (Step 510) or can end the editing process. Upon ending the editing process, the public-facing version of the knol is modified (Step 512).

If the owner or collaborator chose to hold one or more suggested edits, then the held suggested edits are carried over to the next version of the knol. That is, if the current public-facing version of the knol before the editing session is "Version 1", and the public-facing version of the knol after the editing session is "Version 2", then the held suggested edits are now pending with respect to Version 2 of the knol. The owner or a collaborator can then, perhaps at a later time, make a decision whether to apply the carried over suggested edits to Version 2 or to reject them altogether.

In one implementation, each suggested edit can be applied like a layer on top of the public version. Visual highlights or strike-out mark-ups can indicate sections of the text that have been removed or added. The mark-up can be color-coded to an author that made the suggestion.

In one implementation, a conflict resolution feature is provided such that an owner or collaborator can resolve conflicts as between two different suggested edits. For example, the conflict detection/resolution sub-module 210 can provide the conflict resolution feature. A first delta (i.e., unaccepted suggested edit) may include an edit deleting a sentence. A second delta may include an edit to change the wording of the sentence, but not delete the sentence. The two deltas are therefore in conflict at least with respect to this particular sentence; the owner or collaborator can only accept either the first or second delta, but not both.

The conflicting content can be presented in a distinctive manner to indicate the conflict. The owner or collaborator can be required to resolve the conflict before continuing to edit the knol. In this particular example, the conflict can be resolved by: (1) rejecting both deltas; (2) accepting the first delta and rejecting the second delta; or (3) rejecting the first delta and accepting the second delta. If the conflict as between the first and second deltas is limited to only a portion of the one or both of the two deltas, i.e., one or both deltas included other suggested edits that were not in conflict with each other, the conflict resolution can be limited to just the conflicting portion of the deltas. That is, if the second approach above is taken, the second delta can be rejected only insofar as the conflict, and the suggested edits in the balance of the second delta can be accepted or rejected by the owner or collaborator, as they see fit.

A conflict detection mechanism (e.g., conflict detection/resolution sub-module 210) can be employed to detect conflicts between suggested edits. In one implementation, the conflict detection mechanism uses a modified version of a three-way merge algorithm. A typical three-way merge algorithm looks for overlapping edits to content and assumes that if there is overlap there is a conflict. Even if the overlap region is only a relatively small portion of the overall two edits, the entire two edits are flagged as being in conflict. By contrast, the modified three-way merge algorithm applied here can reduce the region identified as the conflict region to the actual content in conflict. Further, there can be an examination of the conflict region to determine whether an actual (rather than assumed) conflict exists. That is, it is possible that two overlapping edits make the same edit to a word to correct for a spelling error. In that case, there is in fact no conflict, as both edits can be accepted.

An optional comment can be appended at the time of rejection or approval of a suggested edit. In additional, any comment appended to a suggested edit can be replied to by the owner or collaborator. An edit can remain in an edit log and be marked as accepted or discarded. In one example the edit log is included in the editing information 318 in the data store 312. All edits that contributed to the current public facing version of the section can be listed. In the case that the edit was the result of accepting suggested edits, those suggested edits can be listed as "children" of the authoritative edit (i.e., the edit of the owner or collaborator). At each editing step, an "undo" operation can be supported, such that any previous version can be reverted to.

In one implementation, when someone other than an owner or collaborator enters an edit mode to make a suggested edit to the knol content, that person is not privy to other suggested edits already within the "suggested edits module", and/or comments attached to earlier or pending suggested edits. That is, the person can only input their suggested edit without viewing editing history, pending edits, etc. In another implementation, such a person can view the pending edits in the suggested edits module at the time of inputting their own suggested edit. However, their edit will be relative to the current public-facing version of the knol, not relative to any pending suggested edits in the suggested edits module. In other implementations, only certain persons that are neither an owner nor a collaborator are authorized to view other edits and/or an edit log, history or edits, etc., and would have to authenticate their identity before being granted access to the other edits.

In one implementation, a person editing a knol can compare any two versions of the knol content, or a section thereof, and see the additions and deletions that were performed in order to bring the older version toward the newer version. These additions and deletions can be represented with mark-up that is similar to the suggested edit mark-up. In some implementations, another view can allow the entire knol to be highlighted in colors corresponding to the ownership of each word in the document, where ownership can be defined as the person who added a particular word into the document.

In some implementations, discussion threads can be attached to a knol (see 320, FIG. 3). The threads can be searchable, filterable (by date, author, etc.) and generally viewed in reverse chronological ordering of the last time the discussion thread was created or any reply was made. In some implementations, comments and edits to a knol are searchable by explicitly searching knol comments, but they do not themselves come up as web search results.

The knol user interface can provide a page editor. In an edit mode, the author and authorized users (e.g., collaborators) can modify page-level properties and rearrange components within the knol. For example, subject to permission limits, the page editor can be used to edit meta information about a knol. Examples of meta information that can be modified using the page editor include: page name, authors list, bool indicating allowed contributions, permissions, creative-commons level and revenue sharing strategy. In one implementation, the meta information can be modified inline or in a separate page. The meta information can be displayed as simple key/value pairs in a form.

In one implementation, in addition to meta information, other information about the knol's table of contents or section arrangement and configuration can be edited. By editing the table of contents, the underlying sections can be adjusted accordingly. For example, a new section can be inserted at a selected position in the table of contents, a section can be deleted from the table of contents or a section can be moved (e.g., dragged and dropped) within the table of contents.

In one implementation, a paste operation can be used to create a knol. For example, text or other content can be pasted from a clipboard as a transclusion (live feed), as a template (inherit the template of the original) and/or by copying the content.

The knol user interface can provide a history of the knol. That is, the knol's revision history can be viewed, including, information about who made each revision and how much they changed. The differences between two versions of the knol can be viewed, showing the changes ("diff") made as between the two particular versions. The history can be used to rollback to a particular version of the knol. In some implementations, only the owner and collaborators can view the history of the knol. In other implementations, persons other than the owner and collaborators can view history, either all other persons or else certain persons either identified by name or meeting a certain criteria.

In one implementation, the knol user interface is implemented using a mixture of Jotscript, client, server and translucent javascript and XML plug-in components. Jotscript and the server-side jot library can give access to features such as page and data transclusion, inheritance, search, templates (applying "styles") and forms (applying particular views and interaction-affordances upon a page). Pages can be stored natively in XML with XHTML in the "main/text" property of a node. A node is a container of properties.

There can be three categories of pages: knol pages, author pages and admin pages. A knol page can include all of the properties constituting a knol including edit nodes (i.e., suggested edits to a knol page) and discussion nodes (i.e., pieces of dialog about a page). An author page can include all of the properties describing an author (i.e., an authorized user), and tool and administration pages for authors. The author's tools can be anchored off a knol page, which itself describes the author. Admin pages can include tools for trusted administrators. Each page type can have a set of forms, where a form behaves as a filter selecting subsets of the page for display and providing affordances for manipulating parts of the data. In some implementations, authors and authorized users are not permitted to write javascript or server-side javascript. Rather, they are restricted to particular data formats and plug-ins.

As mentioned above, a node is a container of properties. Objects can be stored in nodes. The following is a description of some objects that can be stored in nodes to implement the knol user interface. A knol can be a node of user-created content visible as a web-page or as a transclusion. A knol can have other knols transcluded as sections within the knol. Knol metadata can be a node associated in a one-to-one relationship with a knol and includes metadata about that knol. For example, related knols, discussions, edits and authors can be included in knol metadata. A write to a knol increments the knol's user-visible version number, but a write to a knol metadata does not.

An author can be an abstract class that can own and create knols. An author is represented as a node including author-specific properties (e.g., permissions, preferences, etc.). An author can be associated in a one-to-one relationship with an author-knol, where an author-knol is an autobiographical knol used as a home-page for that author. A group can refer to an author that aggregates other authors.

A message is a node including text that is written by another author and then sent to another object where others can find and transact with it. A discussion is a note posted as a reply to a knol or to another discussion item. An edit is an attempt to modify the content of a knol. An edit-response is sent by an author in response to an edit, e.g., accept, reject, discuss, etc. An offer is an attempt to grant ownership or permissions to an author. An offer-response is an author accepting or declining the given offer. A request-review object can be an author soliciting a peer review. A request-review-response object can be an author accepting or declining a peer review. If accepted, the review can be done as a discussion or knol object.

The nodes discussed above can have none, some or all of the following common properties. A path property can be a path to a page. A name property can be a page's name. A revision property can be a page's revision. An i.d. property can be a page's i.d. A user property can be a user. A time property (or editTime property) can show when the page was edited. A createTime property can show when the page was created. A createUser property can show who created the page. A main/text property can be xhtml content of the page/message.

A knol can have a unique URL, e.g., {site}/{title}/{author_url} where site is a website (e.g., knol.google.com), the title is the knol's title and the author_url can include an author name and/or disambiguation number. Past versions of a named document can be retrieved by appending a revision CGI argument, e.g., "?revision=42". A URL including a revision number can be usable as a permanent historical link. Changing the title of a knol can imply renaming it and changing its URL. If an author's name changes, or if a page is transferred from one author to another, that can result in renaming all of the author's page URLs. If a nodeID is specified, e.g., "?nodeID=4747", the nodeID can be persistent across renaming operations. In one implementation, a hit against the {site} can be resolved into a search for {query}/{author}, where the query and author can be soft/incomplete matches. Internally, knols can refer to each other using the nodeID field. In other implementations, the knol can have a permanent URL that can be a machine readable sequence of pseudo-random alphanumeric letters permanently associated with the knol irrespective of any later changes to the knol's title or ownership.

The main/text property of a knol supplies the knol's content. The content may in turn include transcluded knols, which may or may not have their own, different authors. Consider the following illustrative example. A Mrs. P is the Dean of Astronomy, Astrology and Cosmology at a certain school. She wishes to author a knol on Dark Matter. Mrs. P creates the knol and then creates three knols transcluded as sections, calling them Chapter A, Chapter B and Chapter C. Mrs. P adds Mr. K as co-author of Chapter A, Mr. G as co-author of Chapter B and Mr. R as co-author of Chapter C. The co-authors in turn delegate the actual text writing to graduate students. Mrs. P is well on the way toward producing the knol in her name on the subject of Dark Matter.

For a given knol, it can be desired to know whether the knol is "top-level" (i.e., independently searchable) or just "content" (i.e., it will not come up in a search as an entity in its own right, but it can be indexed as content of a parent page). A "content" knol can be abandoned by a parent, i.e., no longer referenced by a parent page. In some implementations, an abandoned knol is no longer visible as public-facing online content and is not findable in a web search, but may be findable by reviewing past versions of a document.

Figure 6A:
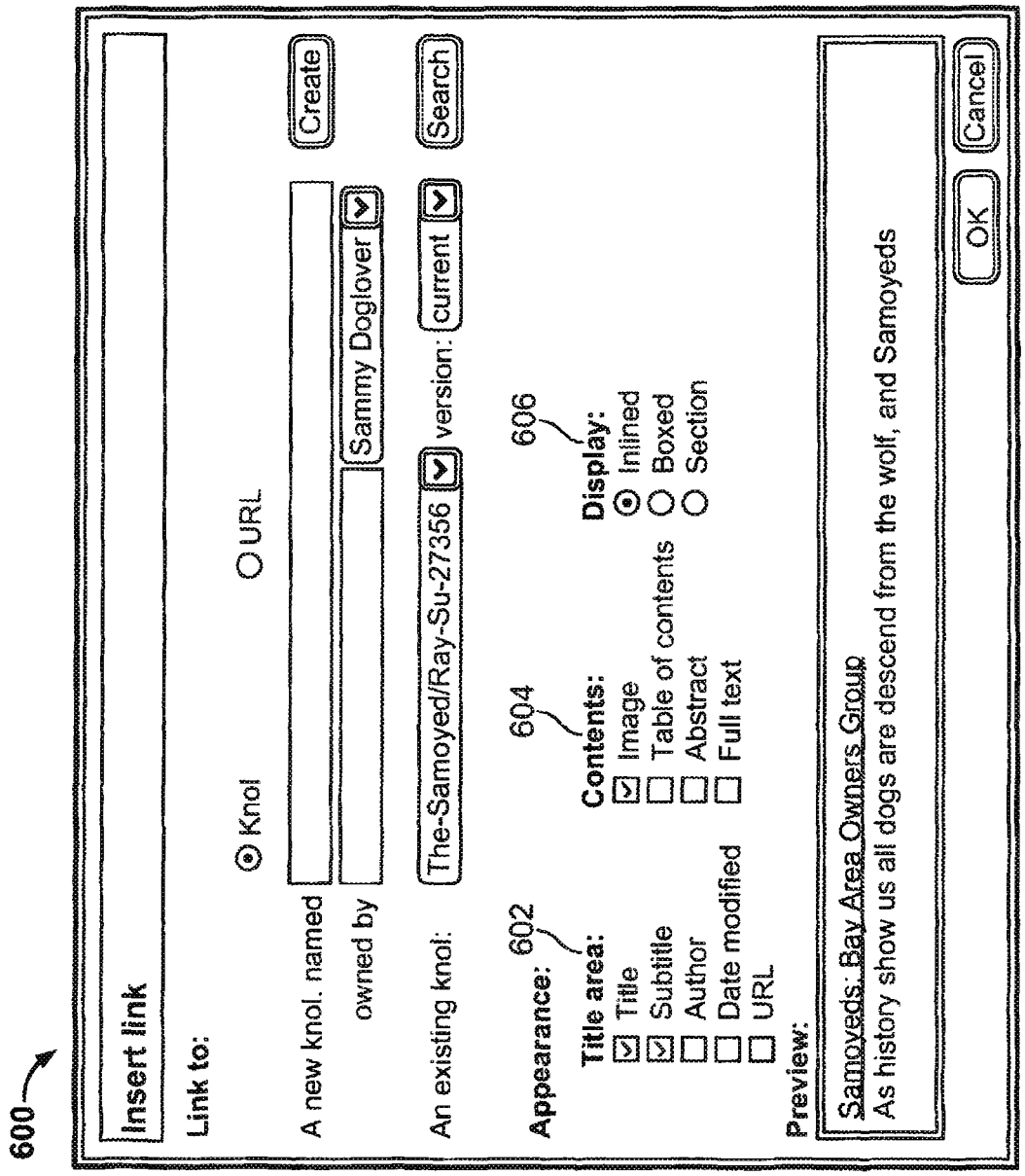
Figure 6B:
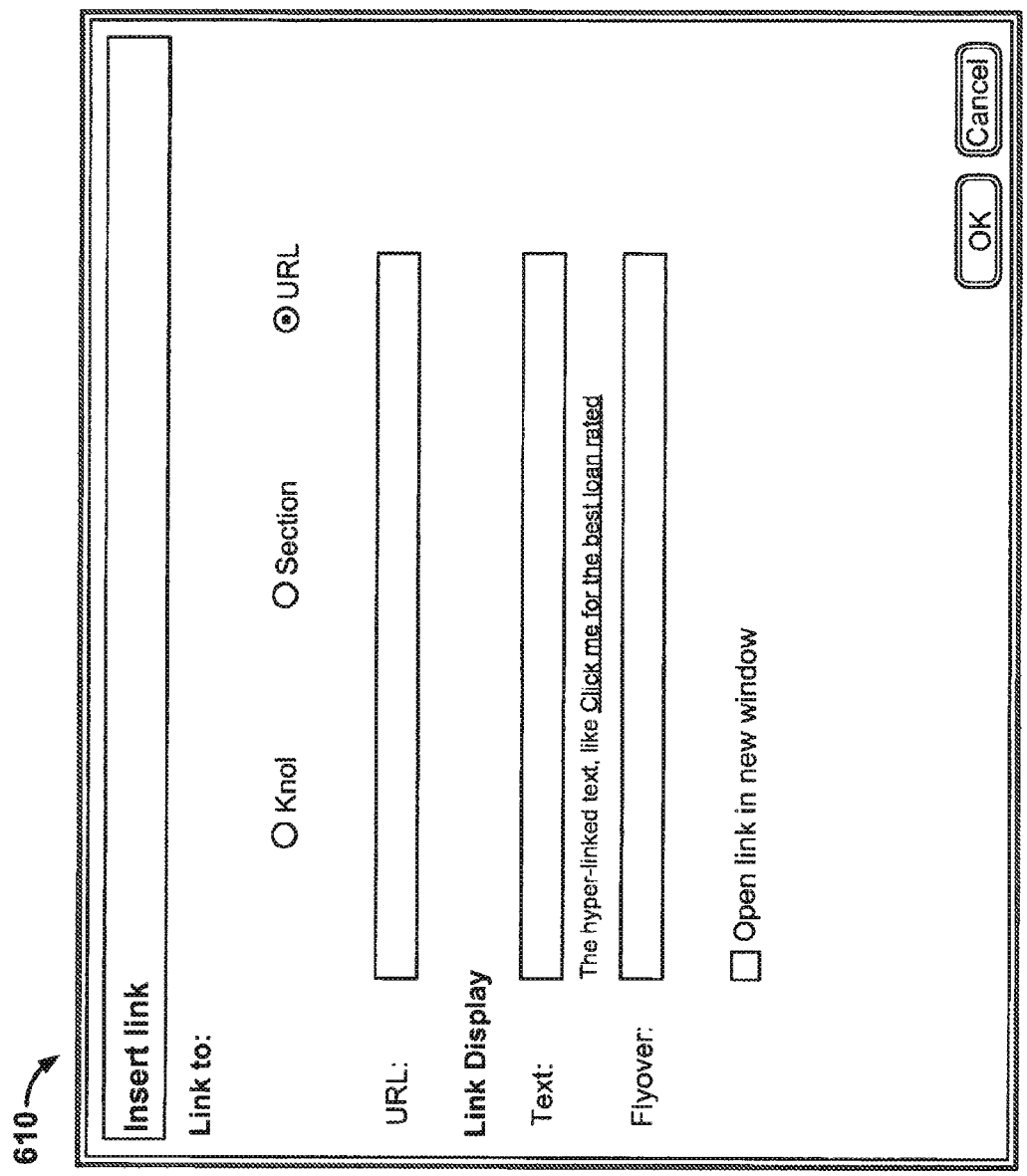

Referring to FIG. 6A, an example graphical user interface 600 is shown whereby an author of a first knol can link the first knol to a second, existing knol, either by naming the second knol or naming a URL to access the second knol (see user interface 610 in FIG. 6B). In the example shown, a new knol is being linked to an existing knol entitled "The-Samoyed/Ray-Su-27354". The properties listed in the title area 602, i.e., title, subtitle, author and date modified, can become a hyperlink to the second knol. The URL can be a web address to access the second knol. The contents properties 604 include the following. The image property can be the first image included within the second knol. The table of contents can be algorithmically generated by traversing the second knol's contents. The abstract can be a snippet composed of the first few lines of the knol, following the title and subtitle. The full text can refer to including the entire second knol other than those knols that the second knol recursively includes, which can instead be coerced into the table of contents. The display properties 606 include distinct appearance options. The inline appearance can be possible if the title area content is transcluded. The boxed appearance can take the transcluded content and wrap it into a standardized frame with text flow around it, e.g., magazine style. The section appearance can treat the transcluded knol as a section within the parent knol.

Figure 6C:
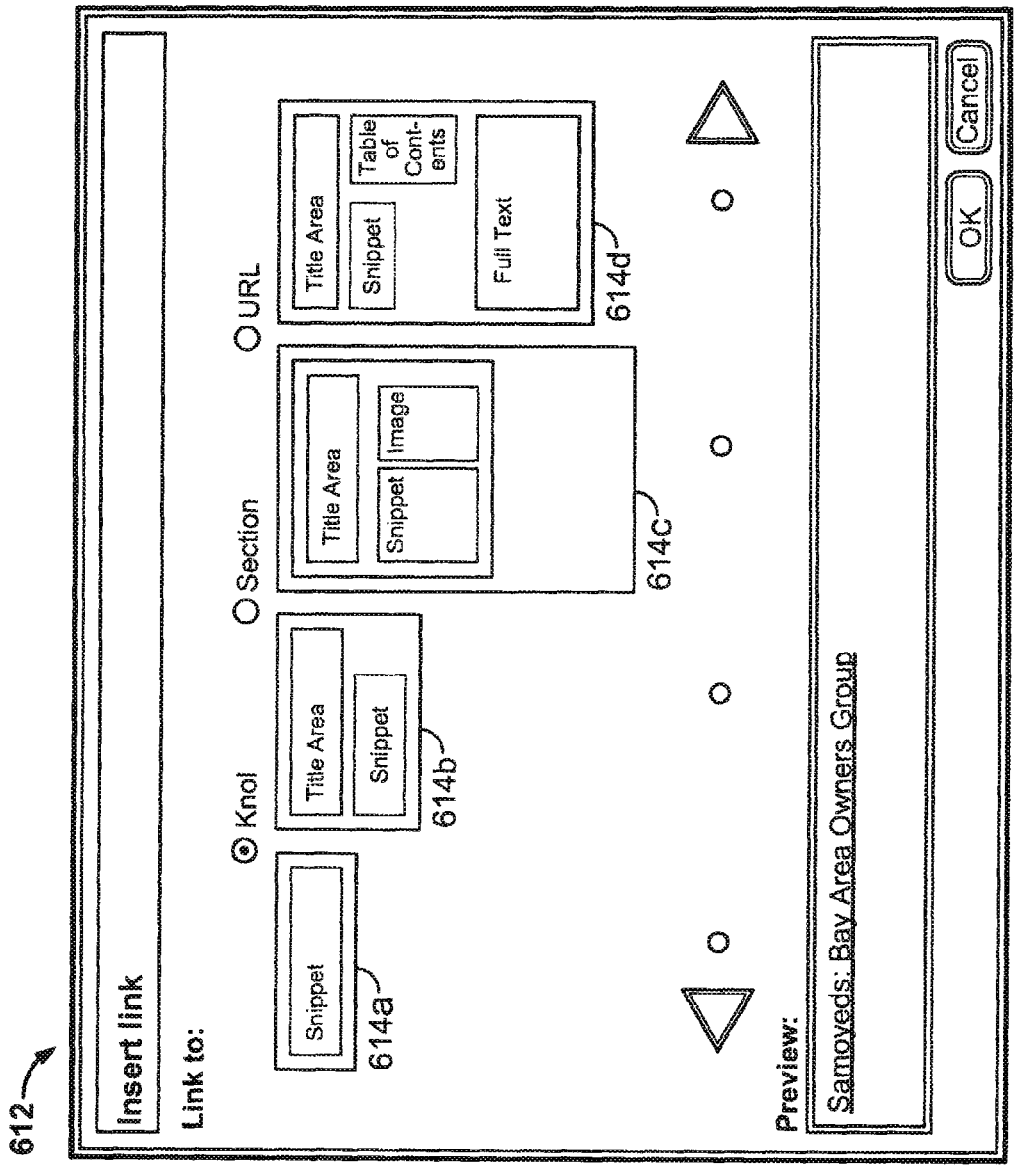

Referring to FIG. 6C, an example graphical user interface 612 is shown where an author of the first knol can select a transclusion appearance for the second knol to be transcluded in the first knol. Example appearances 614a-d are shown.

Table 1 below shows some example knol page properties, including the property names, types, values and a description of each.

TABLE 1

Knol Page Properties

| Property | Type | Value | Description |
| --- | --- | --- | --- |
| Title | String | | Title of the page which can relate to the query that the knol is primarily competing for (i.e., to be provided as the "best answer"). |
| Subtitle | String | | An optional subtitle for the page which can be used for disambiguation. |
| Role | String | Standard | Indicates this is a standard content page, i.e., an ordinary knol. |
| Role | String | Template | Indicates this page is to be used and found as a template and not as a top-level knol. |
| Role | String | Author | Indicates this page is an author's "home page". |
| Role | String | Group | Indicates this page is a group's "home page". |
| Categories | StringList | | A list of terms to which this belongs; these terms may or may not be linked to other knols. |
| Authors | StringList | | List of owner/admins. |
| AuthorsPending | StringList | | Transfers of ownership; need to be confirmed by the recipient. |
| AuthorsVisible | Number | | The first n authors are shown on the page. |
| Contributors | StringList | | A list of non-owners who have rights to edit the knol. |
| ContributorsPending | StringList | | An offer to pen a document to a contributor that needs to be confirmed by the recipient. |
| ContributorsVisible | Number | | The first n contributors can be shown on the page. |
| RedirectTo | String | | If this page is discontinued, then non-owners who browse to it can get forwarded to a new page. |
| Contribution/contributors | String | | A list of those persons who have provided textual input to the knol; generally overlaps with the authors. |
| Contribution/location | String | | If text included in the knol came from another resource, e.g., copied from a book or other website, the source can be identified and attributed. |
| Contribution/tokens | Number | | For each contributor or original source, this is the number of tokens contributed by the author. |
| bannedReasons | StringList | | If non-empty, this knol is banned from display. For example, affiliate links, ads, buy buttons, spam, or spam may be reasons for a ban. The author can view and edit the knol, but the public cannot view the knol. |
| Sections | StringList | | A list of the nodeIDs of the sections. |
| publishedVersion | Integer | | Identifies the version visible to the public. |

The knol user interface can provide an author page including content about the author. Examples of content that can be included in an author page are: a picture of the author; author's name; statistical information; author's profile; names of co-authors (and links to their author pages); titles of knols authored by and/or contributed to by the author; a control to get an RSS feed of articles written by the author;

and citations by the authors (and links thereto). The edit history of the particular author in relation to the knol can be viewed. In an implementation where author ratings are provided, the author's rating can be viewed. In one implementation, an aggregation of authors is referred to as a "group", and any groups to which the author is a member can be identified.

When the author page is viewed by the author in "edit mode", the author can view and edit many of his or her properties. For example, the author can edit the public-profile content. The author can edit account permissions, such as the default visibility and editability of a knol's pages and persons exempt from the defaults. The author can view reviewers (i.e., people who have responded to the knol content) and sort same by quality or recency. The author can invite or request someone to write a knol or to write a review of pages of a knol of the author. Messages can be provided to the author in the edit mode, including the following examples: a message about a suggested edit; notification of a re-use of the author's content (e.g., by transclusion or text re-use); notification of changes in documents owned, watched or contributed to by the author; an assertion of prior use of the author's content; a takedown demand; a takedown notification; a notification of change of a template used by the author; a quota/limit violation; an error message; an offer to transfer ownership; and bulk changes to properties.

Table 2 below shows examples of author page properties, including the property name, type and a description.

TABLE 2

Author Page Properties

| Property | Type | Description |
| --- | --- | --- |
| Name | String | Author's externally visible name or nickname. |
| Disambiguation | String | Zero or more externally visible blobs of "disambiguation" text, for example, to authenticate credentials of the author. |
| Picture | String | URL to image of the author. |
| Profile | String | User supplied text profile. |
| Co-Authors | StringList | List of persons the author shares ownership of pages with. |
| Knols/Author | stringList | Knols authored by the Author. |
| Knols/contributor | StringList | Knols contributed to but not owned by the author. |
| Knols/Edited | StringList | Knols the author has submitted edits to. |
| Knols/Discussed | StringList | Knols the author has replied to in a discussion. |
| Knols/Reviewed | StringList | Knols the author has reviewed. |
| rateLimitCreate | Number | Maximum frequency with which an author can create new knols. |
| rateLimitEdit | Number | Maximum frequency to edit knols. |
| rateLimitMessage | Number | Maximum frequency to send messages to others. |
| rateLimitInvite | Number | Maximum frequency to invite other authors. |
| Notifications | | A collection of messages/alerts sent to the author. |
| Solicitations | | A collection of messages/alerts sent by the author. |

In one implementation, the owner of a knol may choose to display online advertisements when displaying the knol. The owner typically collects revenue from advertisers, either directly or through a broker, for displaying the advertisements. In one example, the owner can participate in the AdSense advertising program provided by Google, Inc., wherein Google provides advertisements to display with the owner's knol. The advertisements can be selected to target an audience expected to be interested in the content of the knol. If the knol has been contributed to by more than one author, then revenue generated from the online advertisements can be shared between the authors. In one implementation, the author's page properties can include a property to allocate the revenue between the owners of knols to which the particular author is entitled to revenue share.

FIG. 6D shows an advanced search box directed to the searching of knolls. The box in this example is formatted in a manner that is similar to advance search boxes for web content that are generated by GOOGLE, and the particular data fields into which a user may enter data are generally self-explanatory.

Figure 7A:
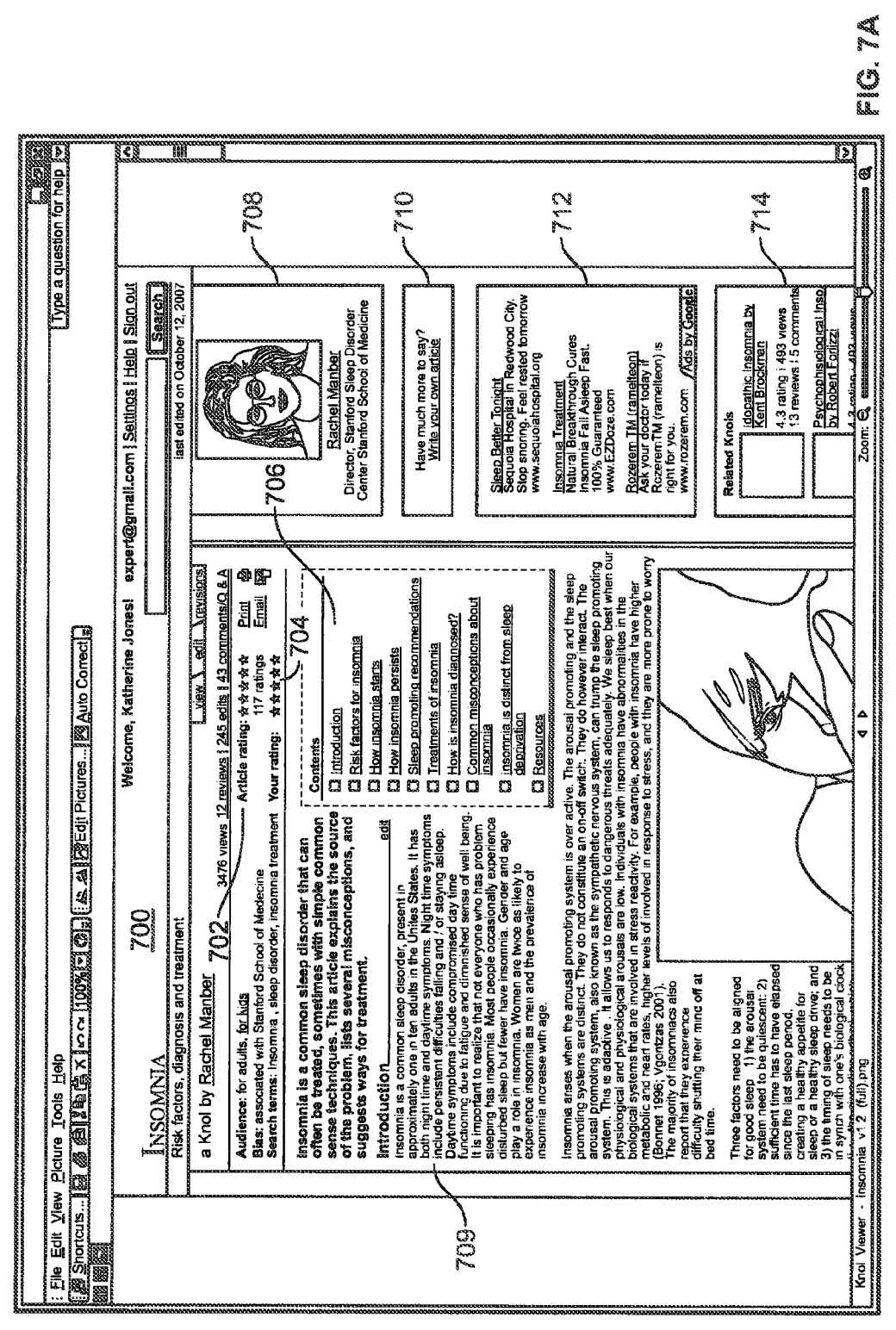
Figure 7B:
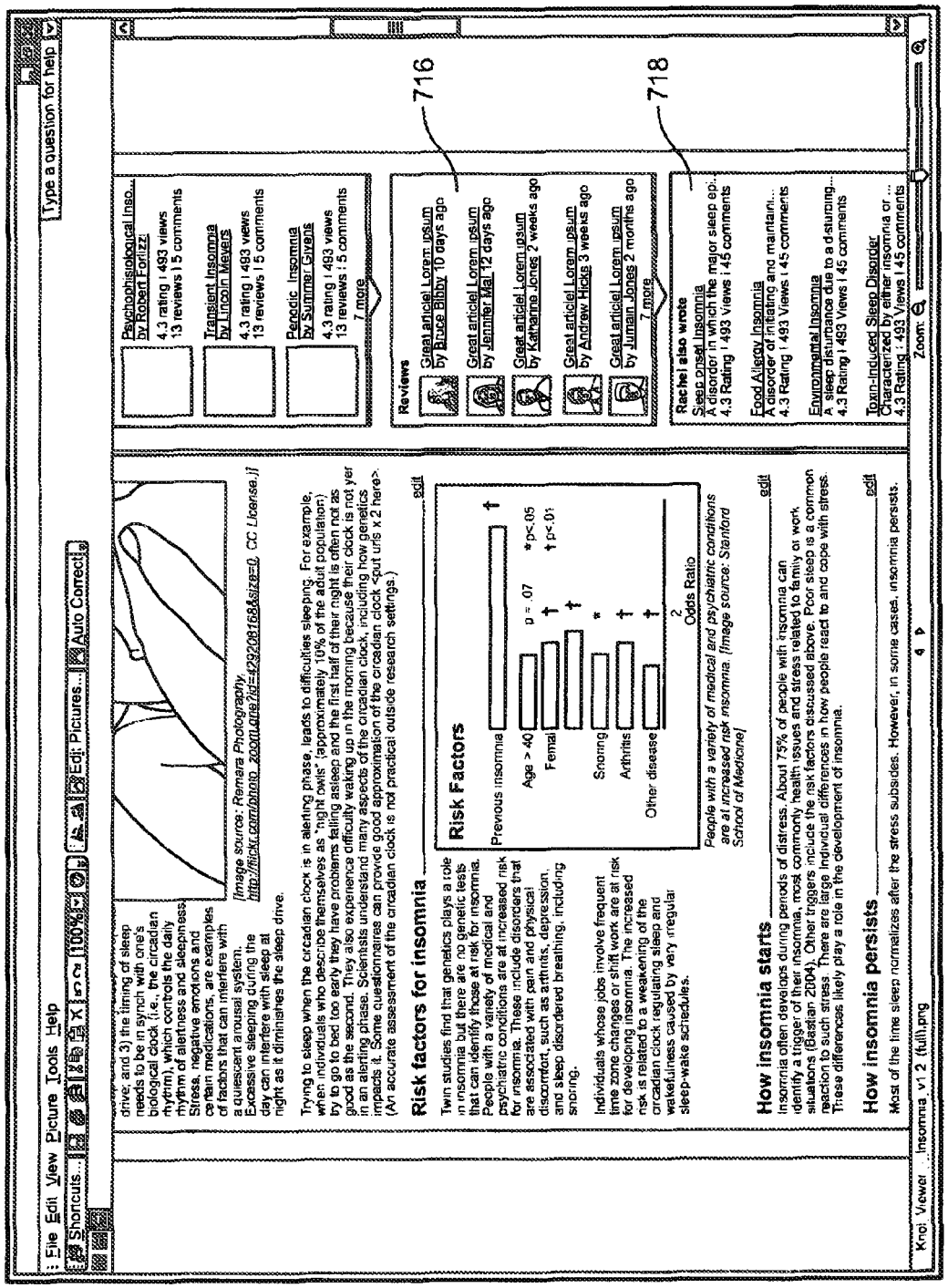

FIGS. 7A-7B show screen shots of a formatted discrete piece of submitted content. The screen shot are shots of a single web page, but with different portions of the page scrolled into view.

In this example, the content is in the form of a knol. The content is presented as a web page on a particular topic—here, insomnia. This piece of content may be presented as a search result, where the search result in presented in a special One Box or similar area, separated from other search results. Such separation may be used to indicate to a user that the result is, in effect, a self-contained exposition on a particular topic that would be useful for a reader seeking an overview or detailed discussion about the topic. Such a result may be contrasted with other results, such as a corporate web page that has marketing information for an insomnia drug, a blog on which the blogger is discussing his or her particular insomnia problems, etc.

The content is labeled with a title 700, which takes a familiar form and is placed at the top of the entry in bold text to be particularly prominent to a viewer of the content. The body 709 of the posting includes a well-organized description and overview of insomnia and related topics. The body 709 may take a variety of forms, and a hyperlinked table of contents 706 may be presented to permit consumers to see at a glance what is covered in the posting and also to jump quickly to particular subsections within the posting by selecting a hyperlink in the table of contents 706.

Consumers or viewers of the document are also presented with a ratings system for the posting. A ratings indicator 702 shows the average rating provided by a number of users who have reviewed and rated the article, here 117 ratings. The displayed rating may simply be an arithmetic average of the various ratings, or may be computed in a number of other ways, such as by normalizing scores by various users to accommodate for users that always provide high ratings and users who always provide low ratings. In addition, a rating may be checked to determine whether fraudulent intent may be involved, such as where a user whose ratings typically agree with the ratings of other users suddenly provides ratings that are in disagreement with such other ratings, thus indicating that the user is in properly trying to push the score for the posting up or down. A "your rating" area 704 shows a user where they may supply their own rating for the posting. The area 704 may be generated using scripting code a such as JavaScript code or other appropriate mechanisms so that a user may conveniently click on a rating level and have such a rating registered for the posting. The users rating may then be taken into account in computing the overall article rating for the posting.

Above the ratings area, several tabs are shown by which a user may view different information about an article. In the figure, the currently selected tab is a view tab which allows the user to view the article or posting itself. An edit tab may permit the user to see various edits that other users have made to the article's, such as to improve the accuracy of the article. The user may also suggest edits for the article themselves with such a tab. Such edits may be pending, in that they have not yet been added to the article that is displayed in the view tab, or they may be accepted, such that they are incorporated in the article as it is displayed in the view tab. A revisions tab may also be selected by a user to see revisions that, for example, the author of the article has made to the article or approved for the article (where others have made the revisions or edits). Such revisions may, in certain implementations, be linked to comments or edits made by users other than the author.

An author element 708 may provide information about the author of the article. Here, the author is Rachel Mann Burr, the director of the Stanford Sleep Disorders Center at the Stanford School of Medicine. An indicator, such as a seal in this example, or other appropriate indicator, may be used to show graphically a certain characteristic of the author. For example, a color of an icon associated with the author may indicate the judged quality of the authors works. For example, new authors who have not received many ratings from other users may not be given an icon at all, whereas more experienced authors may be given silver, gold, or platinum seals (or perhaps red, white, blue, pink, and purple ribbons, as the case may be). Authors who receive bad ratings or other negative feedback from users in the community may be provided with black seals or other indicators that the author's submissions are suspect.

A hyperlink may also be attached to the authors name or other appropriate element, so that members of the community may obtain additional information about the author. Selecting the hyperlink may, for example, bring the user to a list of other articles submitted by the author, personal information about the author that the author has chosen to make available, web search results that involve the authors name, or other similar information.

An author submission box 710 asks users whether they would like to submit information on the same or a similar topic, and thus become an author themselves. Selecting a hyperlink in the box 710 may take the user to an editor or other similar interface by which the user may learn about becoming an author and may also be provided with tools for authoring and submitting content.

An advertising area 712 may contain various targeted advertisements directed toward the topic of the article. Such advertisements may be selected, such as by the GOOGLE ADSENSE system and process. In this example, for instance, advertisements for products and services relating to insomnia and sleep have been located and displayed. The advertisements may generate revenue for the host of the webpage, and by extension for the author, when users click on the ads, according to well-known models for ad revenue generation and sharing.

In this particular example, the level of ad revenue sharing may depend on the reading or reputation given to the particular author. For example, if the author has no rating at all they may have a minor share in ad revenue generated from their posting, while their share of that available ad revenue may increase as their stature in the system increases, e.g., authors with a platinum or other high rating may receive the maximum share of revenue generated from their postings.

Figure 4E:
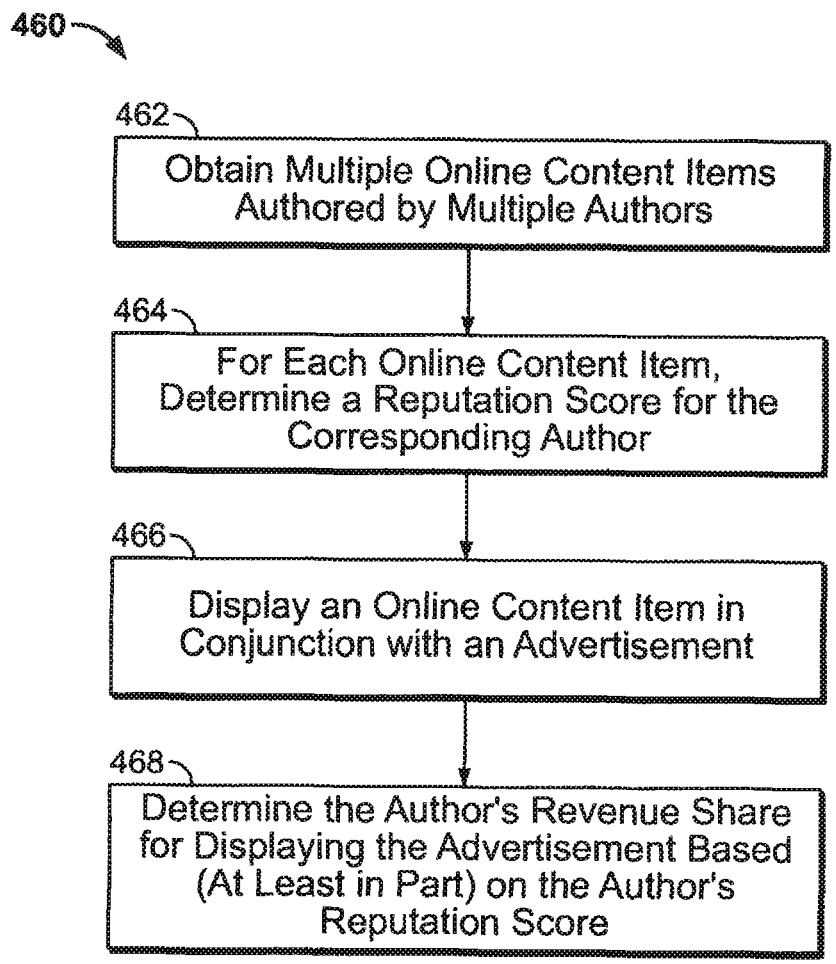
FIG. 4E is a flowchart showing an example process for using an author's reputation score when monetizing an online content item of the author.

Referring now to FIG. 4E, a flowchart shows an example process 460 for using a reputation score when monetizing an online content item. Multiple online content items authored by multiple authors are obtained for online publication (Step 462). For example, in some implementations, the multiple online content items can be obtained by the content manager 402 from the authors 404, as shown in the example system of FIG. 4A. For each online content item, a reputation score for the corresponding author is determined (Step 464). The reputation score can be based on one or more reviews of the online content item provided by one or more reviewers other than the author. For example, in some implementations, the one or more reviews can be received by the content manager 402 from users in the community 408 and/or from the authors 404. An online content item can be published from the multiple online content items received. Publishing the online content item includes displaying the online content item in conjunction with an advertisement (Step 466). For example, in some implementations the online content item can be published by a publisher included in the set of publishers 406. A share of revenue for the author of the online content item for displaying the advertisement can be determined. Determining the author's revenue share can be based at least in part on the reputation score of the author (Step 468).

Such a monetization system may encourage authors to generate more content for the system, and may particularly encourage highly capable authors to generate content because such highly capable authors will receive the highest compensation for their work. In addition, such a sharing mechanism may benefit the publisher of the page, in that highly competent authors will drive greater traffic to the page, and will also cause visitors to the page to click more often on the advertisements shown there. In turn, users benefit by having access to content generated by the highest qualified authors.

A related knols area 714 shows other postings or articles that have been determined by the system to have topics relating to insomnia. For example, here, an article by Kent Brockman relating to idiopathic insomnia has been determined to be related to the insomnia article being displayed. In addition to an image related to the other article, the title for the article, and the author of the article, the area 714 displays the average rating for the other article, the number of users who have viewed the article (so that a user can see whether a statistically significant number of users have contributed to the rating), the number of reviews on the article, and the number of comments that have been provided with respect to the article. The determination of whether an article is sufficiently related to the presently-displayed article may be made by a number of different known as mechanisms, and in particular, mechanisms that compare textual or other content from one page to textual content from other pages in an attempt to determine relatedness of topic between the two articles.

Referring now to FIG. 7B, a reviews area 716 shows links to various reviews that users other than the author have given of the article. Such reviews are formatted in a manner that will be familiar to the typical user. For instance, an image of the particular reviewer is shown, along with a short blurb or title for the review, the name of the reviewer, and the date on which the review was given. Using this information, a consumer of the content may quickly determine whether a particular review is positive or negative, whether it was provided by someone they trust, and whether it is stale or fresh. By clicking on hyperlinks related to a review or a reviewer's name, a user may be taken to the review and read it, or taken to a personal page that discusses information related to the reviewer, such as personal information, articles written by the reviewer, or other reviews written by the reviewer. In addition, though not shown here, a reputation score or other indicator for the reviewer may be shown, such as to indicate their average rating for various articles, or to show their reputation in a community, as determined by the ratings of other users for content generated by each particular reviewer.

Other author articles area 718 lists additional articles that have been submitted to the system by the author or authors of the article that the user is currently reviewing. In this example, a title of each article is shown, along with a snippet from the article, an average rating for the article, a number of times the article has been viewed, and the number of comments submitted for the article. Such an area 718 may allow a user to see quickly that, for example, the author has generated a number of articles on different subtopics in the area of insomnia, which may lead the reader to understand that the author may be an expert in insomnia and is thus capable of generating high-quality articles. Also, the titles of the articles and the snippets may lead the reader to look deeper for other articles in an area and thus learn more about that area. The number of views and comments on an article may also indicate to a reader whether the article was of interest to others, and perhaps whether the article may have raised provocative or controversial points that drew enough interest from readers to justify comments from the readers.

Figure 7C:
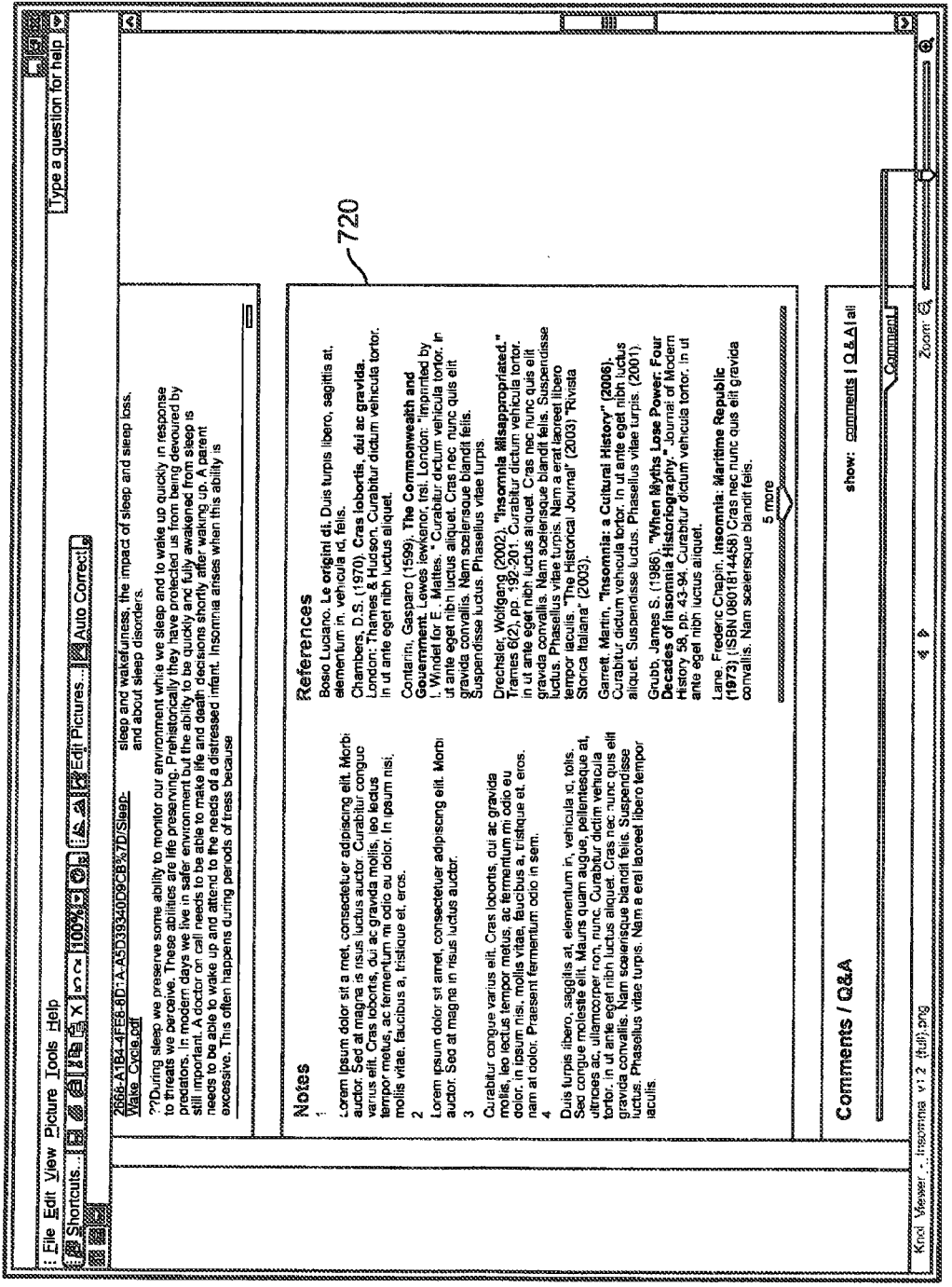

Turning now to FIG. 7C, and lower down in the webpage, is a footer area 720 for the article. This area contains endnotes that may be referenced in the body of the article, along with a bibliography of references cited in the article. Such an area may have the same effect that it would in a typical non-electronic document, leading readers to more detailed information to support positions stated in an article, and also leading readers to other sources where they can learn more about a topic or may better verify what is stated in an article. In addition, in an electronic format, the references may be hyperlinked, where they are available on the Internet, so that the reader may readily be taken to such references. In addition, where the references are books or other documents that may be purchased, they may be referenced and hyperlink, such as by an ISBN number, to a commercial website that is willing to sell the book or other reference.

Figure 7D:
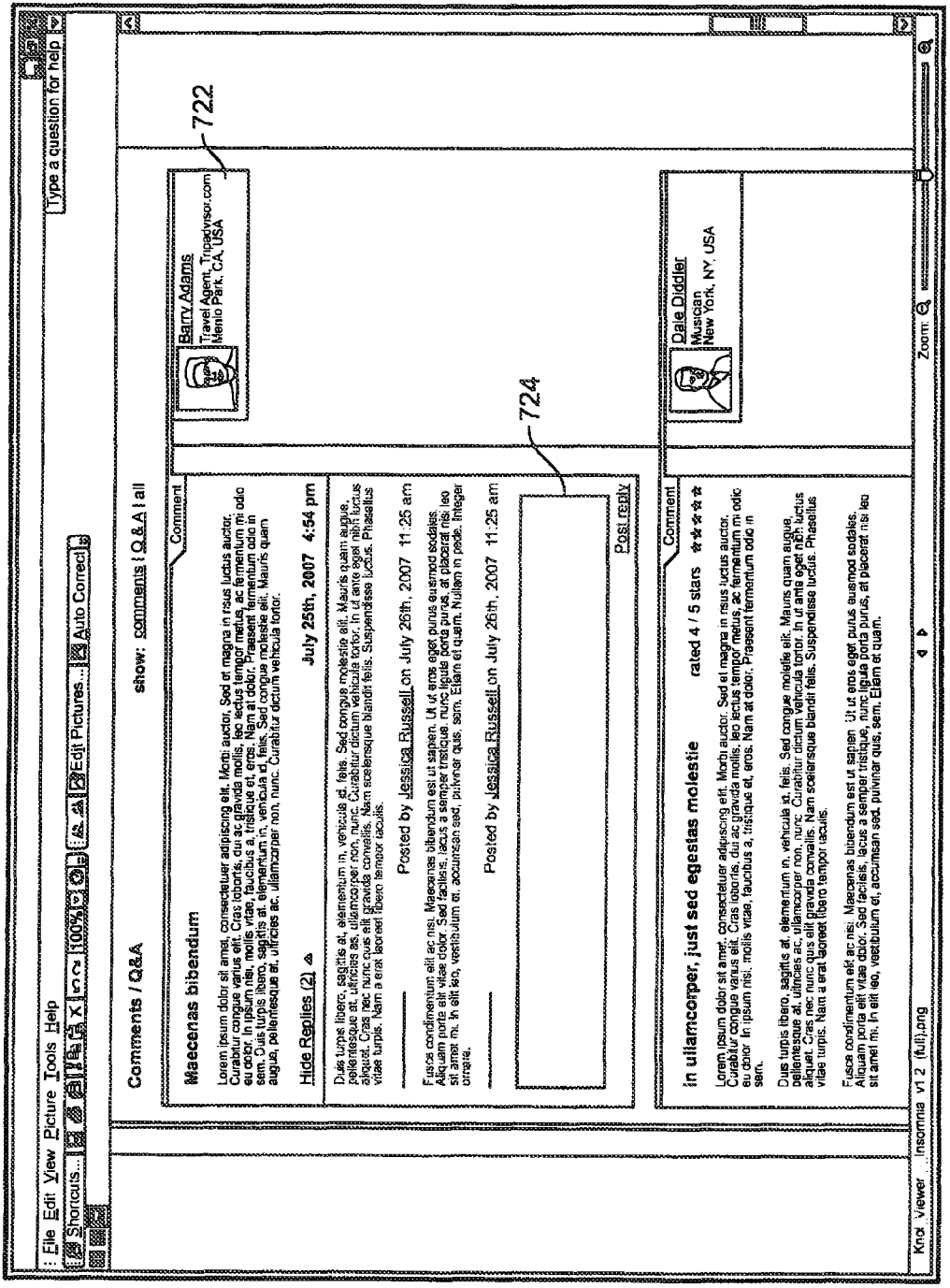

FIG. 7D shows comments 722 that other users have submitted regarding the article. In this example, each of the comments appears to have been made in Latin. The organization of the comments may occur in a familiar form, with comments arranged beneath the article and sorted according to chronological order, by ratings for the articles or for the authors of the comments, or by other mechanisms. Where the system requires authentication of authors and commentors, information showing the identity of each commentor may also be provided as shown. Users may also rate comments in a manner similar to rating of articles or other content, as shown by the second comment in the figure made by Dale Diddier. In this instance, the comment itself may have received ratings from other readers. Alternatively, the rating shown here may represent a rating that the comment tour provided on the main article. Ratings on comments may be used by a system in a manner similar to ratings on articles, as such as by having the ratings affect a reputation score for the commentor, or the author of the comment.

An entry box 724 for a comment on a comment is shown at the bottom of the first comment. Here, an author or other users may post a reply to a comment. In this manner, a discussion may be had in a familiar manner such that incorrect or ill-advised comments may be corrected by other users and the total information conveyed by the site may be improved.

Figure 7E:
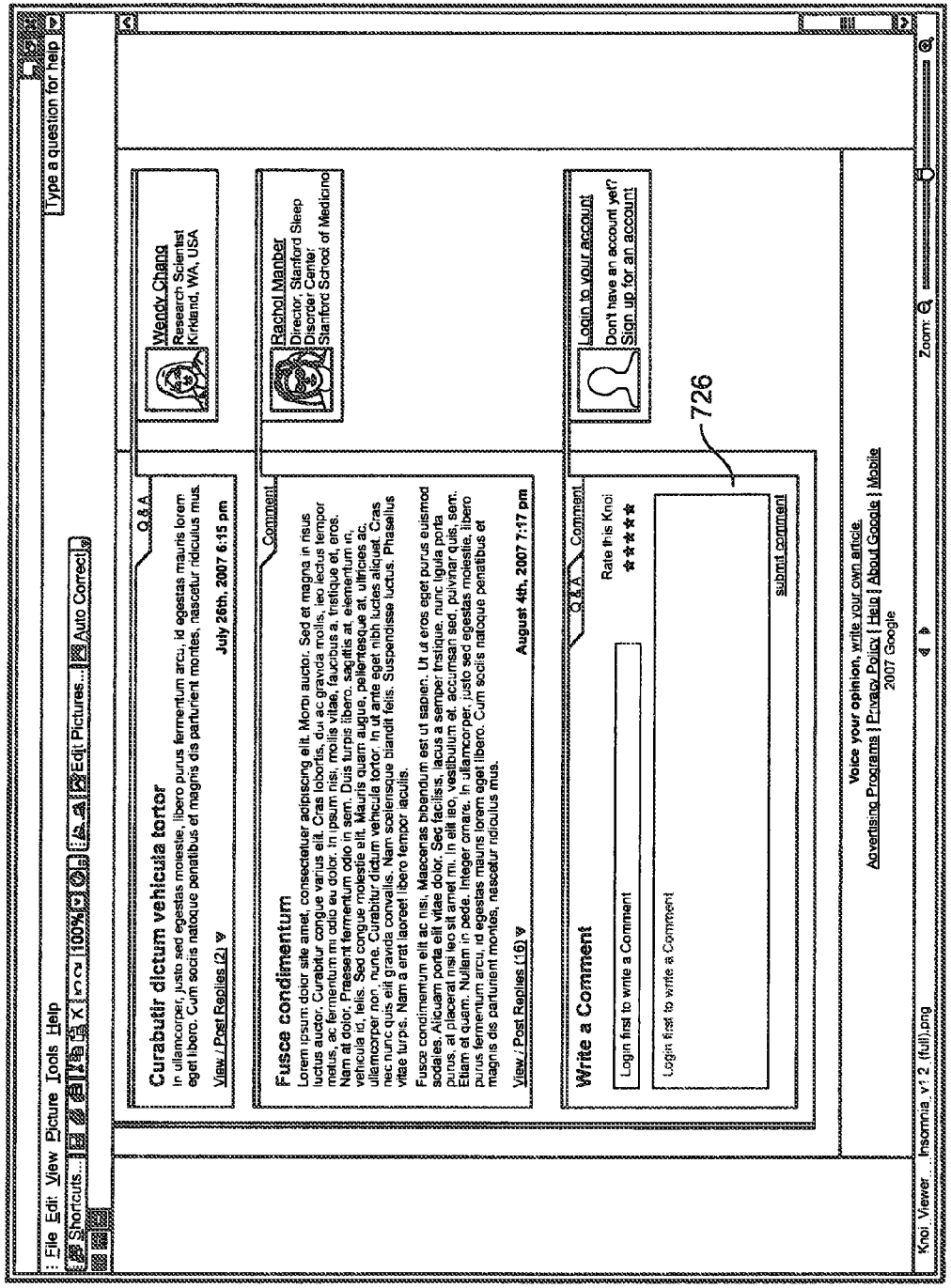

FIG. 7E shows the bottom of this particular webpage, with the provision of a comment submission area 726. In this example, the user viewing the page has not been logged into the system, has thus not been authenticated, and is blocked from commenting (with the page suggesting that they log in if they would like to submit a comment). In general, the user may enter a title that summarizes their comment, and may write the text of the comment in a familiar and well-known fashion. The user may also submit a rating for the article that will be displayed with their comment. And again, at the very bottom of the page, the user is invited to submit their own article on the topic or on a related topic.

The inventions and all of the functional operations described in this specification can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output.

The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language.

Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; a magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

Figure 8:
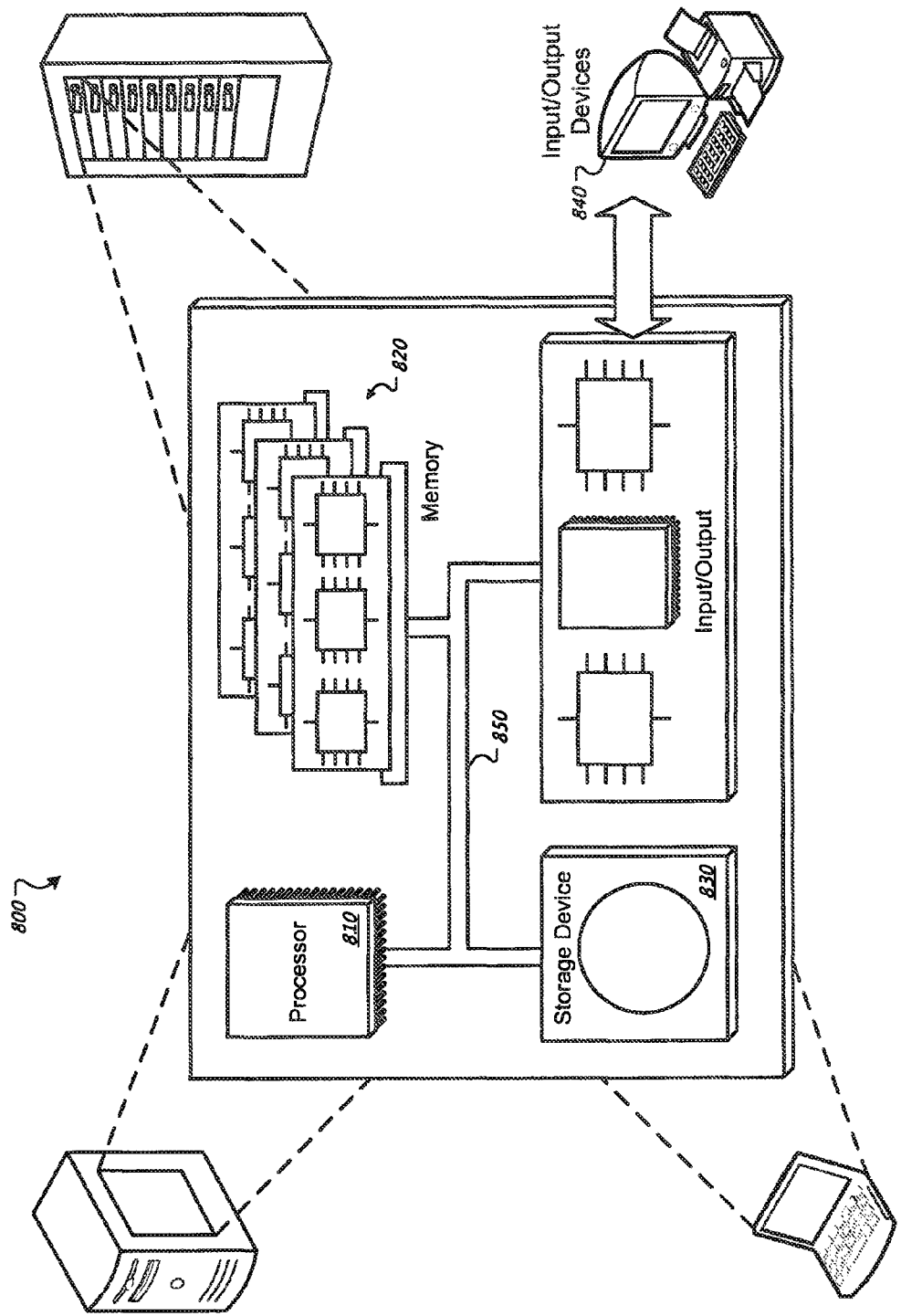
FIG. 8 is a schematic diagram of an example computer system.

Referring now to FIG. 8, a schematic diagram of an example computer system 800 is shown. The system 800 can be used for the operations described in association with the process 300 shown in FIG. 3, according to one implementation. For example, one or more of the systems 800 can be used to implement the content management server 101 (see FIGS. 1 and 2).

The system 800 includes a processor 810, a memory 820, a storage device 830, and an input/output device 840. Each of the components 810, 820, 830, and 840 can, for example, be interconnected using a system bus 850. The processor 810 is capable of processing instructions for execution within the system 800. In one implementation, the processor 810 is a single-threaded processor. In another implementation, the processor 810 is a multi-threaded processor. The processor 810 is capable of processing instructions stored in the memory 820 or on the storage device 830 to display graphical information for a user interface on the input/output device 840. In some embodiments, a parallel processing set of systems 800 connected over a network may be employed, clustered into one or more server centers.

The memory 820 stores information within the system 800. In one implementation, the memory 820 is a computer-readable medium. In one implementation, the memory 820 is a volatile memory unit. In another implementation, the memory 820 is a non-volatile memory unit.

The storage device 830 is capable of providing mass storage for the system 800. In one implementation, the storage device 830 is a computer-readable medium. In various different implementations, the storage device 830 can, for example, include a hard disk device, an optical disk device, or some other large capacity storage device.

The input/output device 840 provides input/output operations for the system 800. In one implementation, the input/output device 840 includes a keyboard and/or pointing device. In another implementation, the input/output device 840 includes a display unit for displaying graphical user interfaces.

A module, as the term is used throughout this application, can be a piece of hardware that encapsulates a function, can be firmware or can be a software application. A module can perform one or more functions, and one piece of hardware, firmware or software can perform the functions of more than one of the modules described herein. Similarly, more than one piece of hardware, firmware and/or software can be used to perform the function of a single module described herein.

It is to be understood the implementations are not limited to particular systems or processes described which may, of course, vary. It is also to be understood that the terminology used herein is for the purpose of describing particular implementations only, and is not intended to be limiting. As used in this specification, the singular forms "a", "an" and "the" include plural referents unless the content clearly indicates otherwise. Thus, for example, reference to "a publisher" includes two or more publishers and reference to "an ad" includes a combination of two or more or different types of ads.

A number of implementations have been described. Nevertheless, it will be understood that various modifications may be made without departing from the spirit and scope of the invention. Accordingly, other implementations are within the scope of this application.

What is claimed is:

1. A method of collaboratively modifying electronic online documents by client devices in a networked environment for display on graphical user interfaces, comprising:

receiving, by a server having one or more processors in a content editing environment, from a first client device via a communication interface of the server, a search query including one or more keywords for content from the content editing environment, the content editing environment including a plurality of modes specifying content editing and viewing permissions;

assigning, by the server, a first user identifier associated with the first client device to a search mode of the content editing environment;

identifying, by the server, a plurality of content items based on the one or more keywords of the search query matching a corpus for each of the plurality of content items of the content editing environment;

retrieving, by the server, a first plurality of recorded interests for the first user identifier, the first plurality of recorded interests comprising:
one or more search queries received from the first client device including the search query,
an indication of content items accessed by the first client device,
an interaction with content items by the first client device, and
one or more edited content items generated by the first client device; and identifying, by the server, a recorded interest common between the first plurality of recorded interests of the first user identifier and a second plurality of recorded interests of each of a plurality of second user identifiers;

selecting, by the server, from the plurality of content items, one or more edited content items based on the recorded interest common between the first user identifier and each of the plurality of second user identifiers, each of the one or more edited content items associated with one or more identifiers of the plurality of second user identifiers;

including, by the server, one or more hyperlinks for each of the one or more edited content items in an online document for display on an Internet user interface on the first client device;

transmitting, by the server, the online document to the first client device;

receiving, by the server, a first interaction indicator with a hyperlink of the one or more hyperlinks on the online document from the first client device, the first interaction indicator identifying a change on the Internet user interface from an address of the online document to an address of a selected content item corresponding to the hyperlink;

assigning, by the server, responsive to receiving the first interaction indicator with the online document, the first user identifier to a view mode of the content editing environment, the view mode permitting the first client device to view a public-facing version of the selected content item;

receiving, by the server, a second interaction indicator with an interface element for modifying the public-facing version of the selected content item;

assigning, by the server, responsive to receiving the second interaction indicator, the first user identifier to an edit mode of the content editing environment, the edit mode permitting the first client device to modify the public-facing version of the selected content item;

identifying, by the server, a region of overlap among a first edited text, a second edited text, and original text of the public-facing version of the selected content item, the first edited text and the second edited text each including modifications made via transclusion to the original text from the first user identifier or the plurality of second user identifiers;

reducing, by the server, the region of overlap based on conflicting text among the first edited text, the second edited text, and the original text;

determining, by the server, conflicting differences based on the region of overlap among the first edited text, the second edited text, and the original text; and transmitting, by the server, the conflicting differences to the first client device for display by the first client device of the conflicting differences on the selected content item.

2. The method of claim 1, further comprising:
updating, by the server, the first plurality of recorded interests for the first user identifier based on the search query from the first user identifier;
tracking, by the server, additional interactions with content items by the first client device, the additional interactions including:
 comments created by the first client device to the one or more edited content items created by the plurality of second user identifiers; and
 ratings specified by the first user identifier to the one or more edited content items created by the plurality of second user identifiers.

3. The method of claim 1, further comprising:
creating, by the server, a common interest group of user identifiers including the first user identifier and the plurality of second user identifiers based on the recorded interest common between the first plurality of recorded interests of the first user identifier and the second plurality of recorded interests of each of the plurality of second user identifiers.

4. The method of claim 3, further comprising:
receiving, by the server, comments and ratings from each of the user identifiers of the common interest group to the one or more edited content items created by at least one user identifier of the common interest group;
ranking, by the server, the one or more edited content items created by the at least one user identifier of the common interest group based on the comments and the ratings; and
placing, by the server, on the online document, the one or more edited content items in ranked order from highest to lowest.

5. The method of claim 4, further comprising:
calculating, by the server, a reputation score of each of the user identifiers of the common interest group based on the rankings of the one or more edited content items created by the client device.

6. The method of claim 1, comprising:
selecting, by the server, from the plurality of content items, the one or more edited content items based on a reputation score of one of the plurality of second user identifiers associated with the one or more edited content items.

7. The method of claim 6, further comprising:
transmitting, by the server, the one or more edited content items, each of the one or more edited content items including an edited version of the content item.

8. The method of claim 6, comprising:
selecting, by the server, the one or more edited content items based on a client user identifier associated with the content item.

9. The method of claim 8, comprising:
identifying, by the server, the one or more edited content items created by at least one of the plurality of second user identifiers, responsive to identifying the recorded interest common between the first plurality of recorded interests of the first user identifier and the second plurality of recorded interests of each of the plurality of second user identifiers; and
selecting, by the server, the one or more edited content items based on identifying the one or more edited content items.

10. The method of claim 8, further comprising:
monitoring, by the server, for creation of a new content item in the content editing environment by at least one of the plurality of second user identifiers; and
transmitting, by the server, to the first client device, the new content item responsive to detecting the creation of the new content item in the content editing environment.

11. The method of claim 1, comprising:
receiving, by the server, the search query including an author identifier;
identifying, by the server, the one or more edited content items associated with the author identifier; and
transmitting, by the server, to the first client device, an identification of the one or more edited content items associated with the author identifier.

12. The method of claim 11, further comprising:
monitoring, by the server, for creation of a new content item in the content editing environment by a third user identifier associated with the author identifier; and
transmitting, by the server, to the first client device, an identification of the new content item associated with the author identifier.

13. The method of claim 12, comprising:
identifying, by the server, content items created by a second author identifier from a plurality of author identifiers including the author identifier; and
transmitting, by the server, to the first client device, an identification of the content items created by the second author identifier from the plurality of author identifiers including the author identifier.

14. The method of claim 1, comprising:
assigning, by the server, the first user identifier to the search mode of the content editing environment, the search mode permitting the first client device to view search results generated based on the search query.

15. The method of claim 1, comprising:
assigning, by the server, responsive to receiving the interaction indicator with the online document, the first user identifier to the view mode of the content editing environment, the view mode permitting the first client device to view, comment on, or rate the one or more edited content items included in the online document.

* * * * *